United States Patent
Okada

(10) Patent No.: US 10,607,123 B2
(45) Date of Patent: Mar. 31, 2020

(54) REMOTELY-OPERATED APPARATUS REMOTELY OPERATED BY EXTERNAL TERMINAL USING A BROWSER USE MODE OR A TRANSMITTED IMAGE USE MODE, REMOTE OPERATION SYSTEM INCLUDING THE SAME, AND RECORDING MEDIUM

(71) Applicant: Konica Minolta, Inc., Tokyo (JP)

(72) Inventor: Tatsunori Okada, Nagaokakyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 206 days.

(21) Appl. No.: 14/102,588

(22) Filed: Dec. 11, 2013

(65) Prior Publication Data

US 2014/0168698 A1    Jun. 19, 2014

(30) Foreign Application Priority Data

Dec. 17, 2012 (JP) ................. 2012-274481

(51) Int. Cl.
*G06F 3/12* (2006.01)
*H04N 1/00* (2006.01)
(Continued)

(52) U.S. Cl.
CPC ......... *G06K 15/007* (2013.01); *G06F 3/1205* (2013.01); *G06F 3/1236* (2013.01);
(Continued)

(58) Field of Classification Search
CPC ............... G06K 15/007; H04N 1/0035; H04N 1/00464; H04N 2201/0075
See application file for complete search history.

(56) References Cited

U.S. PATENT DOCUMENTS 9,264,460 B2 * 2/2016 Kawabata ........... H04L 65/1069
2006/0045544 A1 * 3/2006 Kim ...................... G06Q 10/10
399/8
(Continued)

FOREIGN PATENT DOCUMENTS

JP       05-122424 A     5/1993
JP    2007-140756 A     6/2007
(Continued)

OTHER PUBLICATIONS

Office Action (Notice of Reasons for Refusal) dated Nov. 25, 2014, by the Japanese Patent Office in corresponding Japanese Patent Application No. 2012-274481, with an English translation of the Office Action. (7 pages).

*Primary Examiner* — Beniyam Menberu
(74) *Attorney, Agent, or Firm* — Buchanan Ingersoll & Rooney PC

(57) ABSTRACT

A remotely-operated apparatus remotely operated by an external terminal notifies the external terminal of a first transition command when a server cooperation process which is a cooperation process with a server is performed. The first transition command is a command indicating that a display mode of the external terminal, in which a remote operation screen used for remotely operating the remotely-operated apparatus is displayed on a display part of the external terminal, should be changed from a transmitted image use mode in which a transmitted image screen is displayed to a browser use mode in which a browser screen is displayed. Further, the remotely-operated apparatus notifies the external terminal of a second transition command indicating that the display mode should be changed from the browser use mode to the transmitted image use mode when occurrence of a specific event inside or outside the remotely-operated apparatus is detected.

24 Claims, 12 Drawing Sheets

(51) Int. Cl.
    *G06K 15/02*         (2006.01)
    *G06K 15/00*         (2006.01)

(52) U.S. Cl.
    CPC .......... *G06F 3/1288* (2013.01); *G06F 3/1292* (2013.01); *H04N 1/00347* (2013.01); *H04N 2201/0075* (2013.01); *H04N 2201/0094* (2013.01)

(56) References Cited

U.S. PATENT DOCUMENTS

| | | | |
|---|---|---|---|
| 2007/0109561 A1 | 5/2007 | Suzue | |
| 2008/0021978 A1* | 1/2008 | Maynard | H04L 41/00 709/217 |
| 2008/0270911 A1* | 10/2008 | Dantwala | G06Q 10/10 715/741 |
| 2009/0190165 A1 | 7/2009 | Yoshida | |
| 2010/0257455 A1* | 10/2010 | Park | G06F 3/0227 715/740 |
| 2011/0299111 A1* | 12/2011 | Hasegawa | G06K 15/007 358/1.15 |
| 2012/0062947 A1 | 3/2012 | Shozaki | |
| 2012/0133966 A1 | 5/2012 | Sako | |
| 2012/0274980 A1* | 11/2012 | Koike | H04N 1/00244 358/1.15 |
| 2013/0135640 A1* | 5/2013 | Nagasaki | G06F 3/122 358/1.11 |

FOREIGN PATENT DOCUMENTS

| | | |
|---|---|---|
| JP | 2009-181345 A | 8/2009 |
| JP | 2012-061669 A | 3/2012 |
| JP | 2012-119751 A | 6/2012 |
| JP | 2012-231313 A | 11/2012 |

\* cited by examiner

| IDENTIFICATION NUMBER | CURRENT DISPLAY MODE |
|---|---|
| EXTERNAL TERMINAL 30 → 1 | TRANSMITTED IMAGE USE MODE |

| IDENTIFICATION NUMBER | CURRENT DISPLAY MODE |
|---|---|
| EXTERNAL TERMINAL 31 → 1 | TRANSMITTED IMAGE USE MODE |
| EXTERNAL TERMINAL 32 → 2 | TRANSMITTED IMAGE USE MODE |
| EXTERNAL TERMINAL 33 → 3 | BROWSER USE MODE |

REMOTELY-OPERATED APPARATUS REMOTELY OPERATED BY EXTERNAL TERMINAL USING A BROWSER USE MODE OR A TRANSMITTED IMAGE USE MODE, REMOTE OPERATION SYSTEM INCLUDING THE SAME, AND RECORDING MEDIUM

This application is based on Japanese Patent Application No. 2012-274481 filed on Dec. 17, 2012, the contents of which are hereby incorporated by reference.

BACKGROUND OF THE INVENTION

Field of the Invention

The present invention relates to a remote operation system, and a technique relevant thereto.

Description of the Background Art

Recently, there has been a technique (so-called remote operation technique (remote control technique) with remote connection) for remotely operating a remotely-operated apparatus by using an external terminal such as a smartphone, a tablet terminal, or the like.

Japanese Patent Application Laid Open Gazette No. 05-122424 (Patent Document 1), for example, discloses a technique for remotely operating an image forming apparatus (remotely-operated apparatus) by using an external terminal. Specifically, in Patent Document 1, data (bitmap image data or the like) itself of an operation screen in the image forming apparatus is transmitted from the image forming apparatus to the external terminal, and the operation screen is displayed on a display part of the external terminal. Then, the image forming apparatus is remotely operated in response to an operation input given to the operation screen and data of a new operation screen in accordance with the operation input is transmitted from the image forming apparatus to the external terminal. Thus, according to the technique disclosed in Patent Document 1, it is possible to remotely operate the image forming apparatus (remotely-operated apparatus) by using the external terminal.

In the technique disclosed in Patent Document 1, however, since (a relatively large volume of) data of the operation screen is transmitted from the image forming apparatus to the external terminal every time when an operation input is received, there remains a problem that the communication traffic between the image forming apparatus and the external terminal increases.

SUMMARY OF THE INVENTION

It is an object of the present invention to provide a remote operation system capable of suppressing the communication traffic between an external terminal and any other apparatus and a technique relevant to the same.

The present invention is intended for a remote operation system. According to a first aspect of the present invention, the remote operation system comprises a remotely-operated apparatus, an external terminal for remotely operating the remotely-operated apparatus, and a server capable of making communication with the remotely-operated apparatus and also capable of making communication with the external terminal, and in the remote operation system of the present invention, the external terminal has a display control part for displaying a remote operation screen used for remotely operating the remotely-operated apparatus on a display part of the external terminal by selectively using one of a plurality of display modes including a browser use mode and a transmitted image use mode, the browser use mode is a mode in which a browser screen which is a display screen based on browser communication data acquired from a communication partner by using a browser of the external terminal is displayed, the transmitted image use mode is a mode in which a transmitted image screen which is a display screen based on image data transmitted from the remotely-operated apparatus is displayed, the remotely-operated apparatus has a first notification part for notifying the external terminal of a first transition command indicating that a display mode of the external terminal should be changed from the transmitted image use mode to the browser use mode when a server cooperation process which is a cooperation process with the server is performed, the display control part of the external terminal changes the display mode to the browser use mode in response to the first transition command and displays the browser screen on the basis of the browser communication data acquired by using the browser of the external terminal, the remotely-operated apparatus further has a detection part for detecting occurrence of a specific event inside or outside the remotely-operated apparatus and a second notification part for notifying the external terminal of a second transition command indicating that the display mode should be changed from the browser use mode to the transmitted image use mode when the occurrence of the specific event is detected by the detection part, and the display control part of the external terminal changes the display mode to the transmitted image use mode in response to the second transition command and displays the transmitted image screen on the basis of the image data transmitted from the remotely-operated apparatus in response to the occurrence of the specific event.

The present invention is also intended for a remotely-operated apparatus remotely operated by an external terminal. According to a second aspect of the present invention, the remotely-operated apparatus comprises a first notification part for notifying the external terminal of a first transition command indicating that a display mode of the external terminal, in which a remote operation screen used for remotely operating the remotely-operated apparatus is displayed on a display part of the external terminal when a server cooperation process which is a cooperation process with the server is performed, should be changed from a transmitted image use mode in which a transmitted image screen which is a display screen based on image data transmitted from the remotely-operated apparatus is displayed to a browser use mode in which a browser screen which is a display screen based on browser communication data acquired from a communication partner by using a browser of the external terminal is displayed and for causing the external terminal to change the display mode to the browser use mode, a detection part for detecting occurrence of a specific event inside or outside the remotely-operated apparatus, and a second notification part for notifying the external terminal of a second transition command indicating that the display mode should be changed from the browser use mode to the transmitted image use mode when the occurrence of the specific event is detected by the detection part and for causing the external terminal to change the display mode to the transmitted image use mode.

The present invention is still also intended for a non-transitory computer-readable recording medium. According to a third aspect of the present invention, the non-transitory computer-readable recording medium records therein a computer program to be executed by a computer embedded in a remotely-operated apparatus remotely operated by an external terminal, to cause the computer to perform the steps of a) notifying the external terminal of a first transition command indicating that a display mode of the external terminal, in which a remote operation screen used for remotely operating the remotely-operated apparatus is displayed on a display part of the external terminal when a server cooperation process which is a cooperation process with a server is performed, should be changed from a transmitted image use mode in which a transmitted image screen which is a display screen based on image data transmitted from the remotely-operated apparatus is displayed to a browser use mode in which a browser screen which is a display screen based on browser communication data acquired from a communication partner by using a browser of the external terminal is displayed, and causing the external terminal to change the display mode to the browser use mode, b) detecting occurrence of a specific event inside or outside the remotely-operated apparatus, and c) notifying the external terminal of a second transition command indicating that the display mode should be changed from the browser use mode to the transmitted image use mode when the occurrence of the specific event is detected, and causing the external terminal to change the display mode of the external terminal to the transmitted image use mode.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3 and 4 are views each showing display mode information.

DESCRIPTION OF THE PREFERRED EMBODIMENTS

Hereinafter, with reference to figures, discussion will be made on the preferred embodiment of the present invention.

1. The Preferred Embodiment 1-1. Overall Configuration

Figure 1:
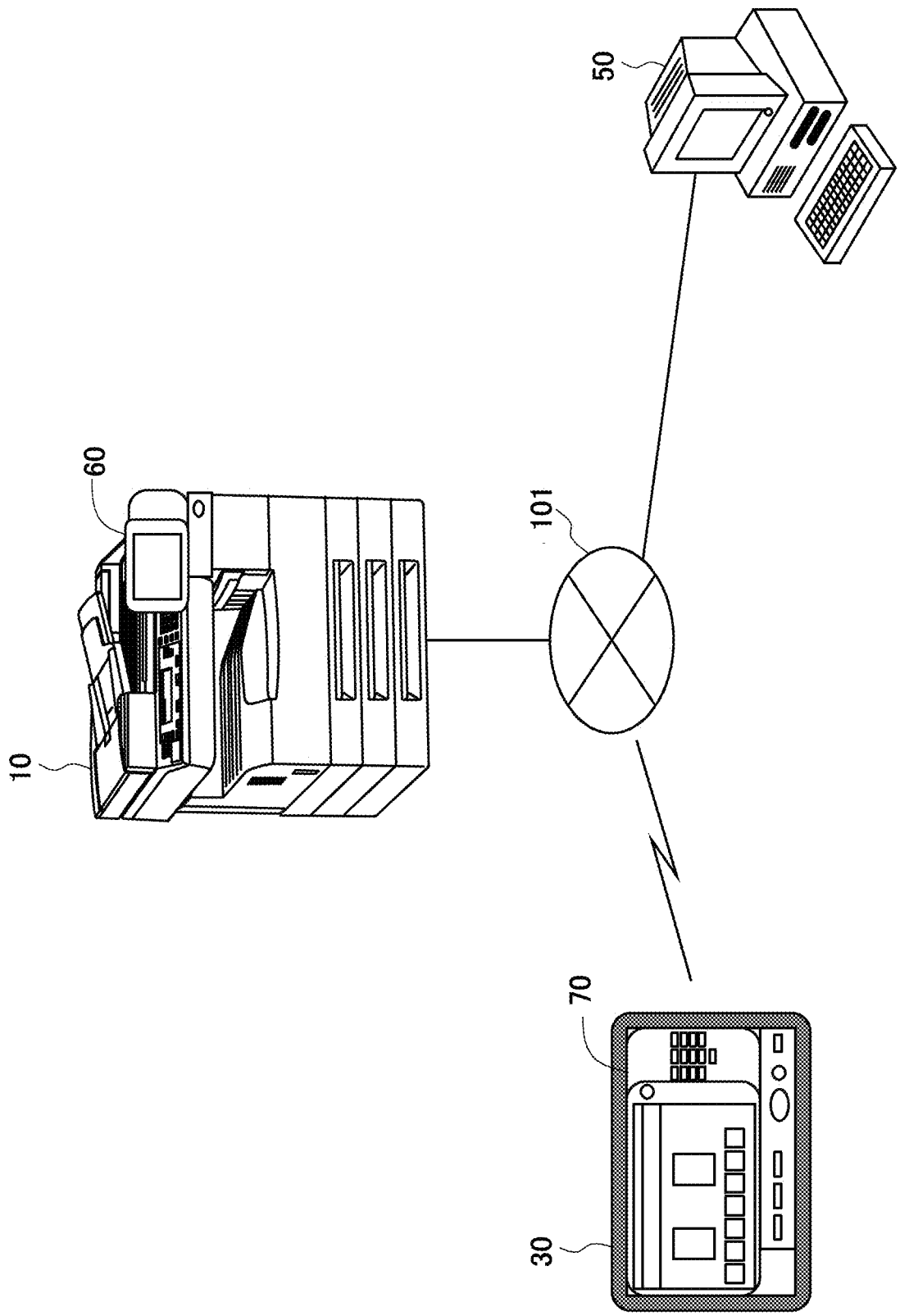
FIG. 1 is a view showing a remote operation system.

FIG. 1 is a view showing a remote operation system 1. As shown in FIG. 1, the remote operation system (remote control system) 1 comprises a remotely-operated apparatus 10, an external terminal device 30, and a server 50.

The remotely-operated apparatus 10, the external terminal device (also referred to simply as an external terminal) 30, and the server 50 are connected communicably to one another via a network 101. The network 101 includes a LAN (Local Area Network), the internet, and the like. The connection between each of the devices and the network 101 may be a wired connection or a wireless connection. There is a case, for example, where the external terminal 30 is connected to the network 101 via wireless communication and the remotely-operated apparatus 10 and the server 50 are connected to the network 101 via wired communication.

The remotely-operated apparatus 10 is an apparatus remotely operated by the external terminal 30. Herein, as an example of the remotely-operated apparatus 10, shown is an MFP (Multi-Functional Peripheral). The MFP (remotely-operated apparatus) 10 is an apparatus having a scanner function, a copy function, a facsimile function, a box storage function, and the like.

In this MFP 10, a server cooperation program is installed. The server cooperation program is a program (hereinafter, referred to as a server cooperation program) for executing a process (hereinafter, referred to also as a server cooperation process) of making communication with the server 50 to ensure cooperation with the server 50, by using a browser of the MFP 10. Specifically, in the MFP 10, installed are the server cooperation programs such as a pull printing program P11, a scan program P12, and the like.

The pull printing program P11 is a program for executing a pull printing process (discussed next). The pull printing process is a process of acquiring print data from the server 50 and performing printing. Specifically, first, after a user gives a print instruction by using a client computer (the external terminal 30 or the like), the client computer transmits print data to the server 50 and once stores the print data into the server 50. After that, when a predetermined operation input from the user is received by a touch panel 60 of the MFP 10 (see FIG. 1), the MFP 10 acquires (pulls) the print data from the server 50 and performs printing.

The scan program P12 is a program for executing a server cooperation scanning process (discussed next). The server cooperation scanning process is a process of storing a scan image that the image reading part 2 (see FIG. 2) (discussed later) generates by reading an original manuscript, into the server 50. Further, the server cooperation scanning process includes a process of generating image data from file data in a storage part 5 (discussed later) of the MFP 10 and storing the image data into the server 50, or the like.

Herein, discussion will be made on a case where the above-discussed server cooperation process (in more detail, the pull printing process) is performed by using the remote operation technique in which the external terminal 30 remotely operates the MFP 10.

The external terminal 30 is a device capable of (remotely) operating the MFP 10. The user who uses the remote operation system 1 can perform various operations of the MFP 10 by using the external terminal 30. The external terminal 30 is also referred to as an operating apparatus (or remote operation (remote control) apparatus) or the like. Herein, as an example of the external terminal 30, shown is a portable terminal, in more detail, a tablet terminal. The external terminal 30, however, is not limited to this but may be a smartphone, a personal computer, or the like. Further, the external terminal 30 may be a portable device or a stationary device.

Further, in the remote operation of the MFP 10, the external terminal 30 can selectively use any one of a plurality of display modes discussed next to display an operation screen (hereinafter, referred to also as a remote operation screen) used for remotely operating the MFP 10 on a touch panel 70 (see FIG. 1). Specifically, the external terminal 30 can selectively use any one of a plurality of display modes including a browser use mode MD1 and a transmitted image use mode MD2 to display the remote operation screen on the touch panel 70.

The browser use mode MD1 is a mode in which a display screen (in more detail, a browser screen 110) based on browser communication data (in more detail, HTTP response data) acquired from a communication partner (in more detail, the server 50) by using a browser (in more detail, a web browser part 37 (described later)) of the external terminal 30 is displayed as a remote operation screen.

The transmitted image use mode MD2 is a mode in which a display screen (also referred to as a transmitted image screen) 300 based on image data (bitmap data or the like of the remote operation screen) transmitted from the MFP 10 is displayed as a remote operation screen.

The server 50 performs the above-discussed pull printing process, the above-discussed server cooperation scanning process, or the like, in cooperation with the MFP 10. For example, when the pull printing program P11 in the MFP 10 is executed, the server 50 serves as a pull printing server, to perform the above-discussed pull printing process. Further, when the scan program P12 in the MFP 10 is executed, the server 50 serves as a scanning cooperation server in which scan data or the like is stored, to perform the above-discussed server cooperation scanning process.

1-2. Constitution of MFP (Remotely-Operated Apparatus) 10

Figure 2:
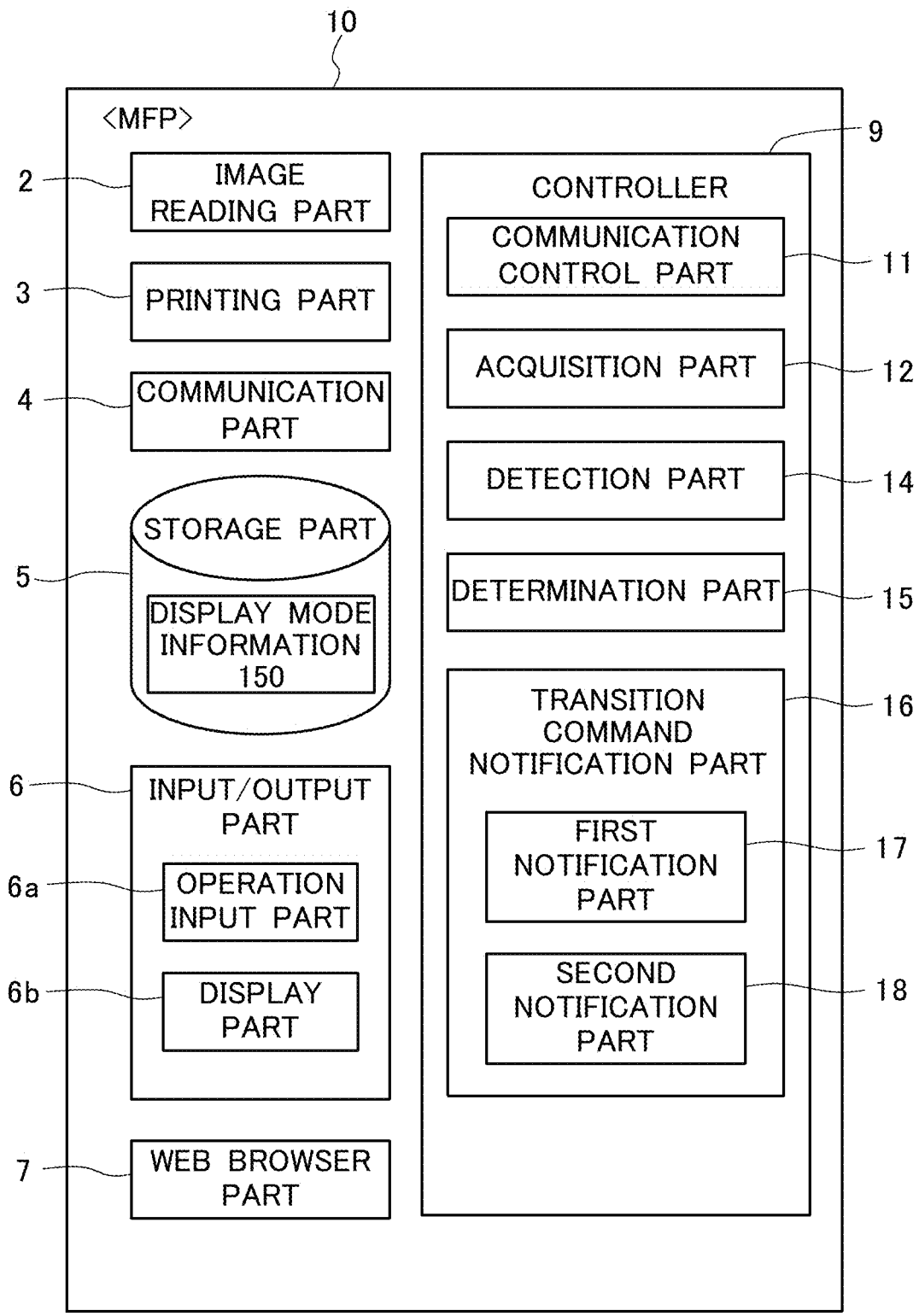
FIG. 2 is a view showing function blocks of a remotely-operated apparatus.

FIG. 2 is a view showing function blocks of the MFP 10.

As shown in the functional block diagram of FIG. 2, the MFP 10 comprises an image reading part 2, a printing part 3, a communication part 4, a storage part 5, an input/output part 6, a web browser part 7, a controller 9, and the like and multiply uses these constituent parts to implement various functions.

The image reading part 2 is a processing part which optically reads (in other words, scans) an original manuscript and generates image data of the original manuscript (also referred to as an "original manuscript image" or a "scan image"). Specifically, the image reading part 2 scans the original manuscript fed by auto document feeder (ADF). The auto document feeder is a processing part for feeding the original manuscript to the image reading part 2.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network 101. The network communication uses various protocols such as TCP/IP (Transmission Control Protocol/Internet Protocol) and the like. By using the network communication, the MFP 10 can transmit and receive various data to/from desired partners (for example, the external terminal 30 or the server 50).

Further, the communication part 4 is capable of transmitting and receiving HTTP request/HTTP response by using HTTP (HyperText Transfer Protocol). Furthermore, the communication part 4 is also capable of exchanging messages by using SOAP (Simple Object Access Protocol) (discussed next) mounted on the HTTP. The SOAP is a protocol based on XML (eXtensible Markup Language), which is used for calling data or services in a computer from another computer. In the communication with SOAP, SOAP messages (also referred to as SOAP commands) which is XML documents with accessory information are exchanged. The communication part 4 has a SOAP message generation part for generating the SOAP message and a SOAP message interpretation part for interpreting the SOAP message.

The storage part 5 is a storage unit such as a hard disk drive (HDD) or/and the like. The storage part 5 stores therein display mode information 150 (see FIG. 3). The display mode information 150 is a table used for managing the display mode of the external terminal 30 connected to the MFP 10.

In this case, the single external terminal 30 is connected to the MFP 10, and in the display mode information (151), as shown in FIG. 3, only the display mode of the external terminal 30 is registered. Specifically, as shown in FIG. 3, the identification number "1" for identifying the external terminal 30 and the display mode (e.g., "transmitted image use mode") of the external terminal 30 associated therewith are registered in the display mode information 150.

In a case where a plurality of external terminals are connected to the MFP 10, respective identification numbers for identifying the plurality of external terminals and respective display modes of the external terminals associated therewith are registered in the display mode information 150. In a case where three external terminals 31, 32, and 33 are connected to the MFP 10, for example, the identification number (e.g., "1") for identifying the external terminal 31 and the display mode (e.g., "transmitted image use mode") of the external terminal 31 associated therewith are registered in the first line of the display mode information 150. Further, in the second line of the display mode information 150, registered are the identification number (e.g., "2") for identifying the external terminal 32 and the display mode (e.g., "transmitted image use mode") of the external terminal 32 associated therewith. Furthermore, in the third line of the display mode information 150, registered are the identification number (e.g., "3") for identifying the external terminal 33 and the display mode (e.g., "browser use mode") of the external terminal 33 associated therewith.

Discussion will be made again on the functional block diagram of FIG. 2.

The input/output part 6 comprises an operation input part 6a for receiving an input which is given to the MFP 10 and a display part 6b for displaying various information thereon. The MFP 10 is provided with a touch panel (also referred to as a touch screen) 60 (see FIG. 1) which is a liquid crystal display panel in which a piezoelectric sensor or the like is embedded. The touch panel 60 serves as part of the operation input part 6a and also serves as part of the display part 6b.

The web browser part 7 is a processing part for making communication (in more detail, HTTP communication) with the server 50 through the browser screen.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined program (software program) P10 stored in the ROM (e.g., EEPROM), to thereby implement various processing parts. Further, the program P10 may be installed into the MFP 10 via various portable recording media (in other words, various non-transitory computer-readable recording media) such as a USB memory or the like or via the network 101 or the like.

Further, as discussed above, the server cooperation programs such as the pull printing program P11, the scan program P12, and the like are also installed in the MFP 10.

As shown in FIG. 2, the controller 9 executes the program P10, to thereby implement various processing parts including a communication control part 11, an acquisition part 12, a detection part 14, a determination part 15, and a transition command notification part 16.

The communication control part 11 is a processing part for controlling a communication with desired partner(s) (the external terminal 30, the server 50, or/and the like), in cooperation with the communication part 4 and the like. For example, the communication control part 11 receives information (hereinafter, referred to also as operation input information) M1 on the operation input to the remote operation screen from the external terminal 30. Further, the communication control part 11 receives a message including a transmission command indicating that image data of a specific setting screen should be transmitted to the external terminal 30.

The acquisition part 12 is a processing part for acquiring the display mode of the external terminal 30 on the basis of the display mode information 150. Specifically, the acquisition part 12 acquires the display mode which is associated with the identification number ("1") of the external terminal 30 by reference to the display mode information 150.

The detection part 14 is a processing part for detecting occurrence of a specific event inside or outside the MFP 10.

The determination part 15 is a processing part for determining whether the browser use mode MD1 or the transmitted image use mode MD2 should be used as the display mode of the external terminal 30.

For example, the determination part 15 determines whether or not an execution start instruction for the server cooperation process was given, on the basis of the operation input information M1 received from the external terminal 30, and when it is determined that the execution start instruction was given, the determination part 15 determines that the browser use mode MD1 should be used as the display mode of the external terminal 30. Further, the operation input information M1 includes information (hereinafter, referred to also as coordinate information) M2 indicating an operation input position in the touch panel 70 of the external terminal 30, and the determination part 15 determines whether or not the execution start instruction for the server cooperation process was given, on the basis of the coordinate information M2. In more detail, the determination part 15 determines whether or not a button corresponding to the server cooperation process (e.g., the pull printing process) in the remote operation screen was pressed, on the basis of the coordinate information M2, and when it is determined that the button was pressed, the determination part 15 determines that the execution start instruction for the server cooperation process was given.

The transition command notification part 16 is a processing part for notifying a command (hereinafter, referred to also as a transition command) TC indicating that the display mode of the external terminal 30 should be changed to a specific display mode. The transition command notification part 16 has a first notification part 17 and a second notification part 18.

The first notification part 17 is a processing part for notifying the external terminal 30 of a command (hereinafter, referred to also as a transition command TC1) indicating that the display mode of the external terminal 30 should be changed from the transmitted image use mode MD2 to the browser use mode MD1 when the above-discussed server cooperation process is performed.

The second notification part 18 is a processing part for notifying the external terminal 30 of a command (hereinafter, referred to also as a transition command TC2) indicating that the display mode of the external terminal 30 should be changed from the browser use mode MD1 to the transmitted image use mode MD2 when the detection part 14 detects the occurrence of a specific event.

1-3. Constitution of External Terminal 30

Figure 5:
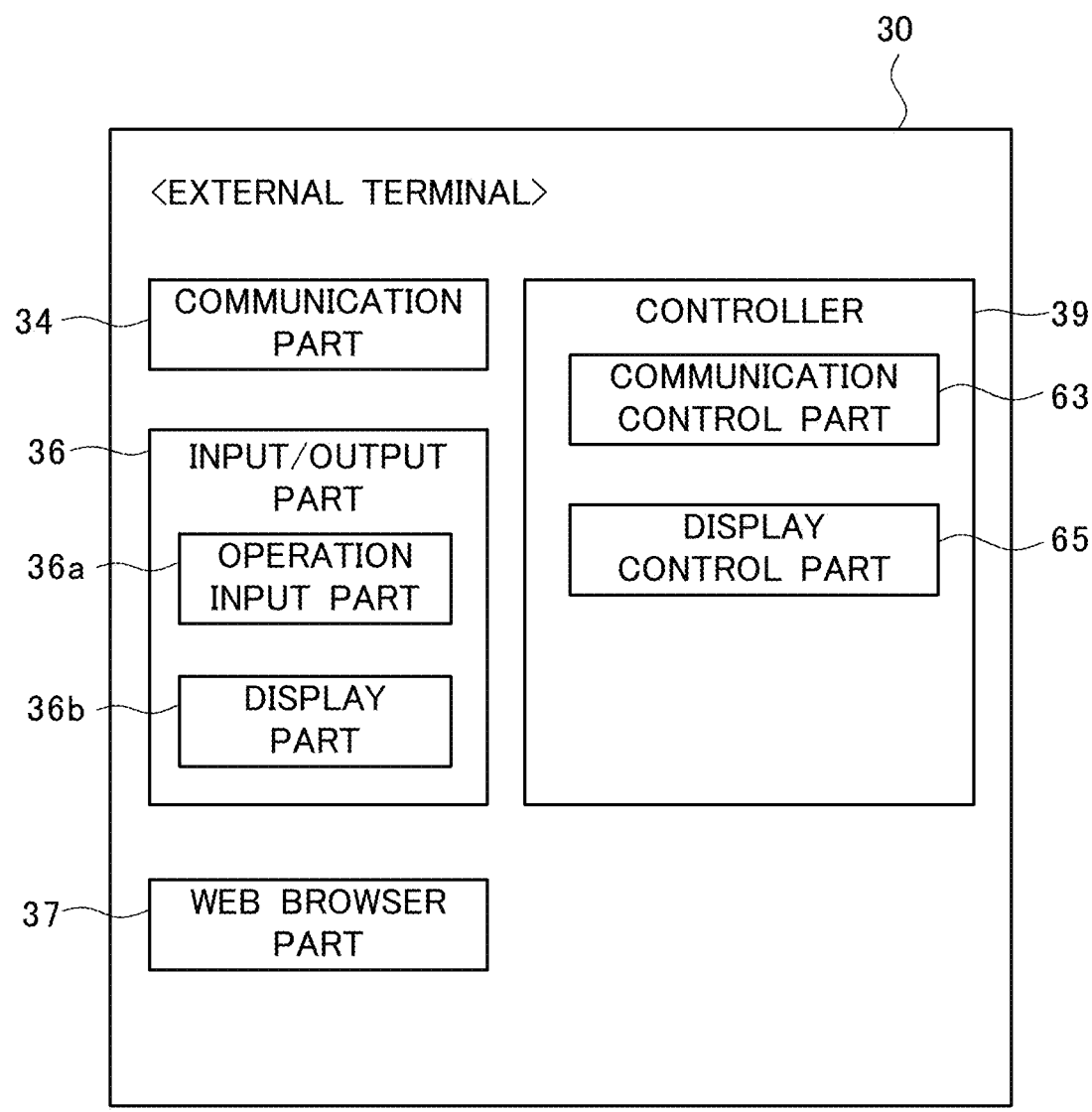
FIG. 5 is a view showing function blocks of an external terminal.

Next, with reference to FIG. 5, discussion will be made on a constitution of the external terminal 30. FIG. 5 is a functional block diagram showing a schematic constitution of the external terminal 30.

As shown in the functional block diagram of FIG. 5, the external terminal 30 comprises a communication part 34, an input/output part 36, a web browser part 37, a controller 39, and the like and multiply uses these constituent parts to implement various functions.

The communication part 34 is capable of performing network communication via the network 101. The network communication uses various protocols such as TCP/IP (Transmission Control Protocol/Internet Protocol) and the like. By using the network communication, the external terminal 30 can transmit and receive various data to/from desired partners (e.g., the MFP 10 or/and the server 50). Particularly, the communication part 34 is capable of transmitting and receiving HTTP request/HTTP response to/from the server 50 by using HTTP (HyperText Transfer Protocol).

The input/output part 36 comprises an operation input part 36a for receiving an input which is given to the external terminal 30 and a display part 36b for displaying various information thereon. The external terminal 30 is provided with the touch panel (touch screen) 70 (see FIG. 1) which is a liquid crystal display panel in which a piezoelectric sensor or the like is embedded. The touch panel 70 serves as part of the operation input part 36a and also serves as part of the display part 36b.

The web browser part 37 is a processing part for making communication (in more detail, HTTP communication) with the server 50 through the browser screen.

The controller 39 is a control unit for generally controlling the external terminal 30. The controller 39 is a computer system which is embedded in the external terminal 30 and comprises a CPU, various semiconductor memories (RAM and ROM), and the like. The controller 39 causes the CPU to execute a predetermined software program (hereinafter, referred to simply as a program) P20 stored in a memory part (semiconductor memory or the like), to thereby implement various processing parts. Further, the program P20 may be installed into the external terminal 30 via various portable recording media (in other words, various non-transitory computer-readable recording media) such as a USB memory or the like or via the network 101 or the like.

As shown in FIG. 5, the controller 39 executes the program P20, to thereby implement various processing parts including a communication control part 63 and a display control part 65.

The communication control part 63 is a processing part for controlling a communication with the desired partners, in cooperation with the communication part 34 and the like.

The display control part 65 is a processing part for controlling a display operation in the display part 36b (the touch panel 70 or the like). For example, the display control part 65 selectively uses either of the browser use mode MD1 and the transmitted image use mode MD2, to thereby display the remote operation screen to be used for remotely operating the MFP 10 on the touch panel 70.

1-4. Constitution of Server 50

Subsequently, discussion will be made on a constitution of the server 50. Herein, as an example of the server 50, shown is a personal computer.

Figure 6:
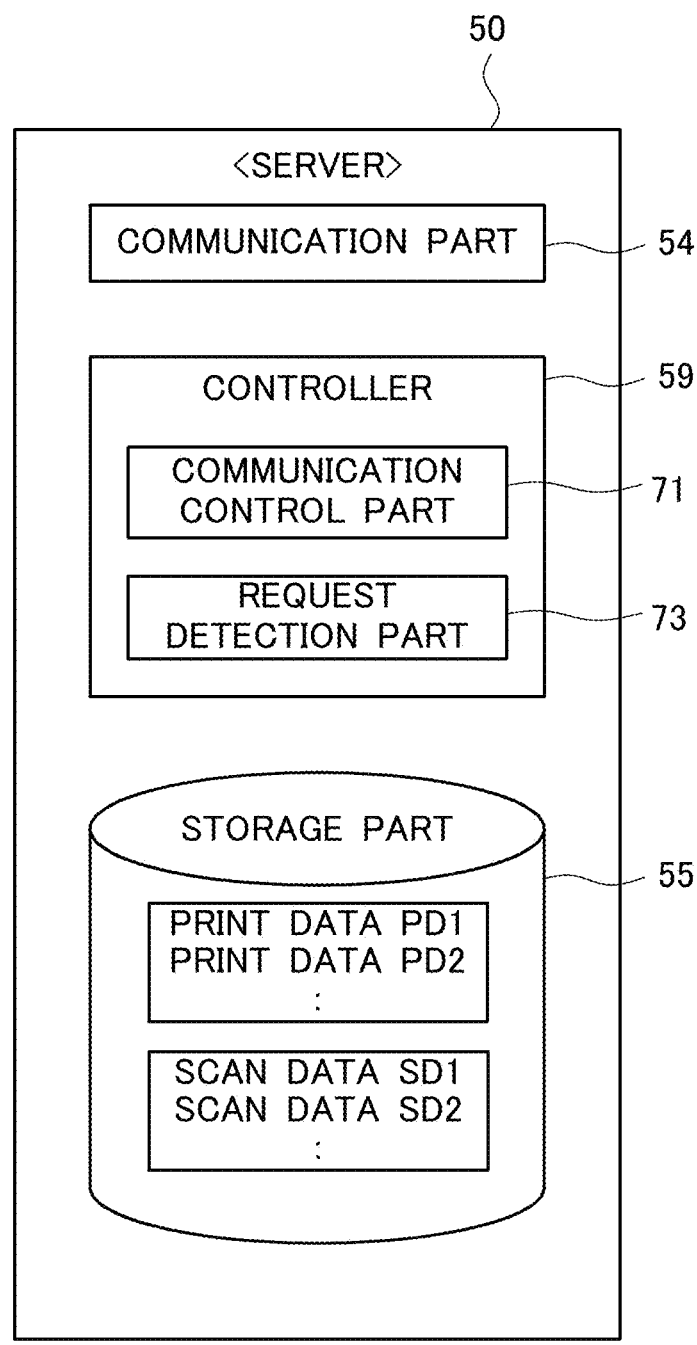
FIG. 6 is a view showing function blocks of a server.

FIG. 6 is a functional block diagram showing a schematic constitution of the server 50.

As shown in the functional block diagram of FIG. 6, the server 50 comprises a communication part 54, a storage part 55, a controller 59, and the like and multiply uses these constituent parts to implement various functions.

The communication part 54 is capable of performing network communication via the network 101. The network communication uses various protocols such as TCP/IP (Transmission Control Protocol/Internet Protocol) and the like. By using the network communication, the server 50 can transmit and receive various data to/from desired partners (e.g., the MFP 10 or/and the external terminal 30).

Further, the communication part 54 is capable of transmitting and receiving HTTP request/HTTP response by using HTTP (HyperText Transfer Protocol). Furthermore, the communication part 54 is also capable of exchanging messages by using SOAP (Simple Object Access Protocol) mounted on the HTTP. The communication part 54 has a SOAP message generation part for generating the SOAP message and a SOAP message interpretation part for interpreting the SOAP message.

The storage part 55 is a storage unit such as a hard disk drive (HDD) or/and the like. The storage part 55 stores therein print data PD (PD1, PD2, . . . ) transmitted from the client computer or the like. The storage part 55 also stores therein the scan data SD (SD1, SD2, . . . ) generated by the image reading part 2 of the MFP 10, or the like.

The controller 59 implements various processing parts including a communication control part 71 and a request detection part 73.

The communication control part 71 is a processing part for controlling a communication with the desired partners, in cooperation with the communication part 54.

The request detection part 73 is a processing part for detecting a display request for a specific setting screen generated by the MFP 10 in the communication with the external terminal 30. For example, the request detection part 73 analyzes the HTTP request received from the external terminal 30 to detect the display request for a specific setting screen.

1-5. Operation

<Outline>

Figure 7:
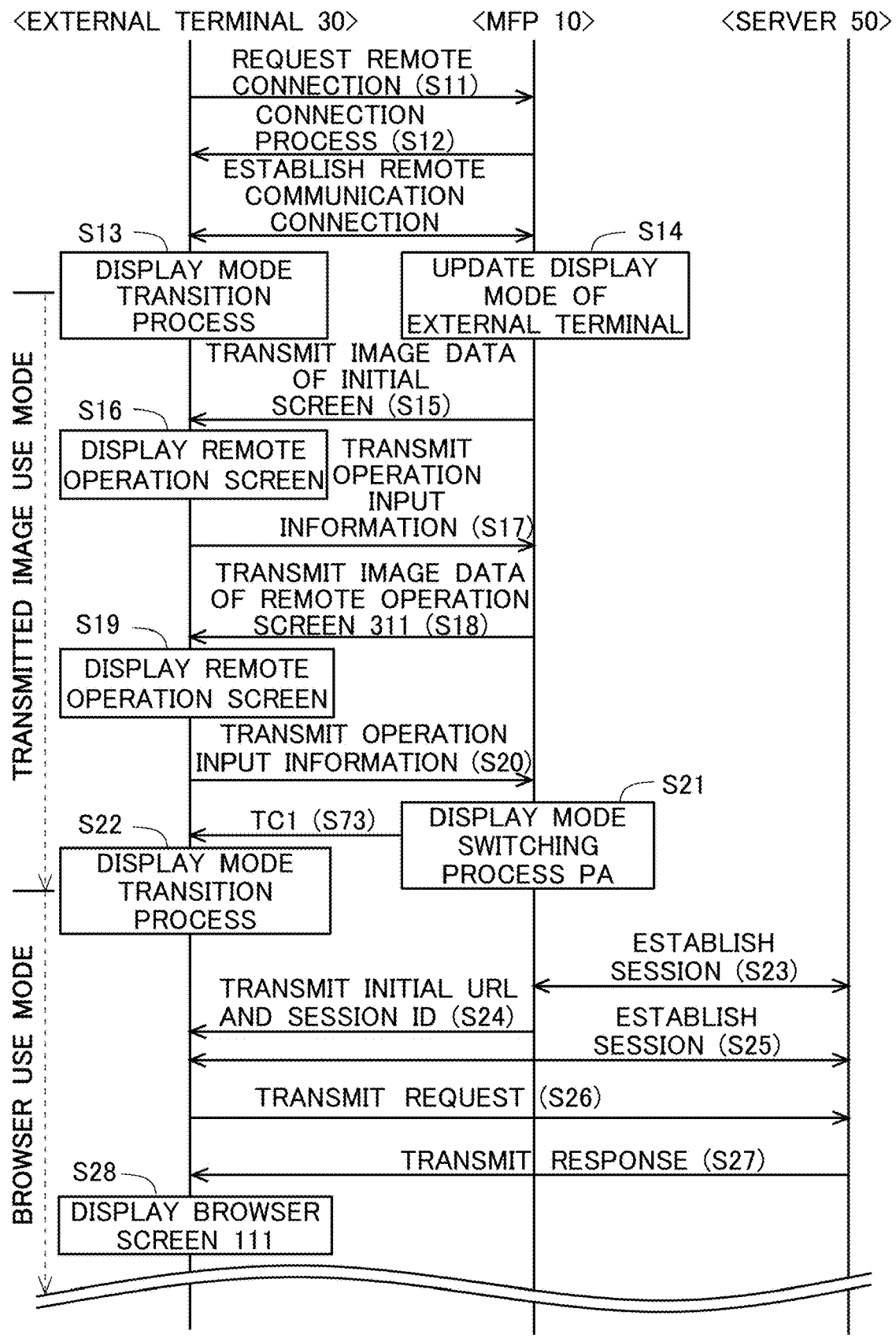
FIGS. 7 and 8 are sequence diagrams showing an operation of the remote operation system.
Figure 8:
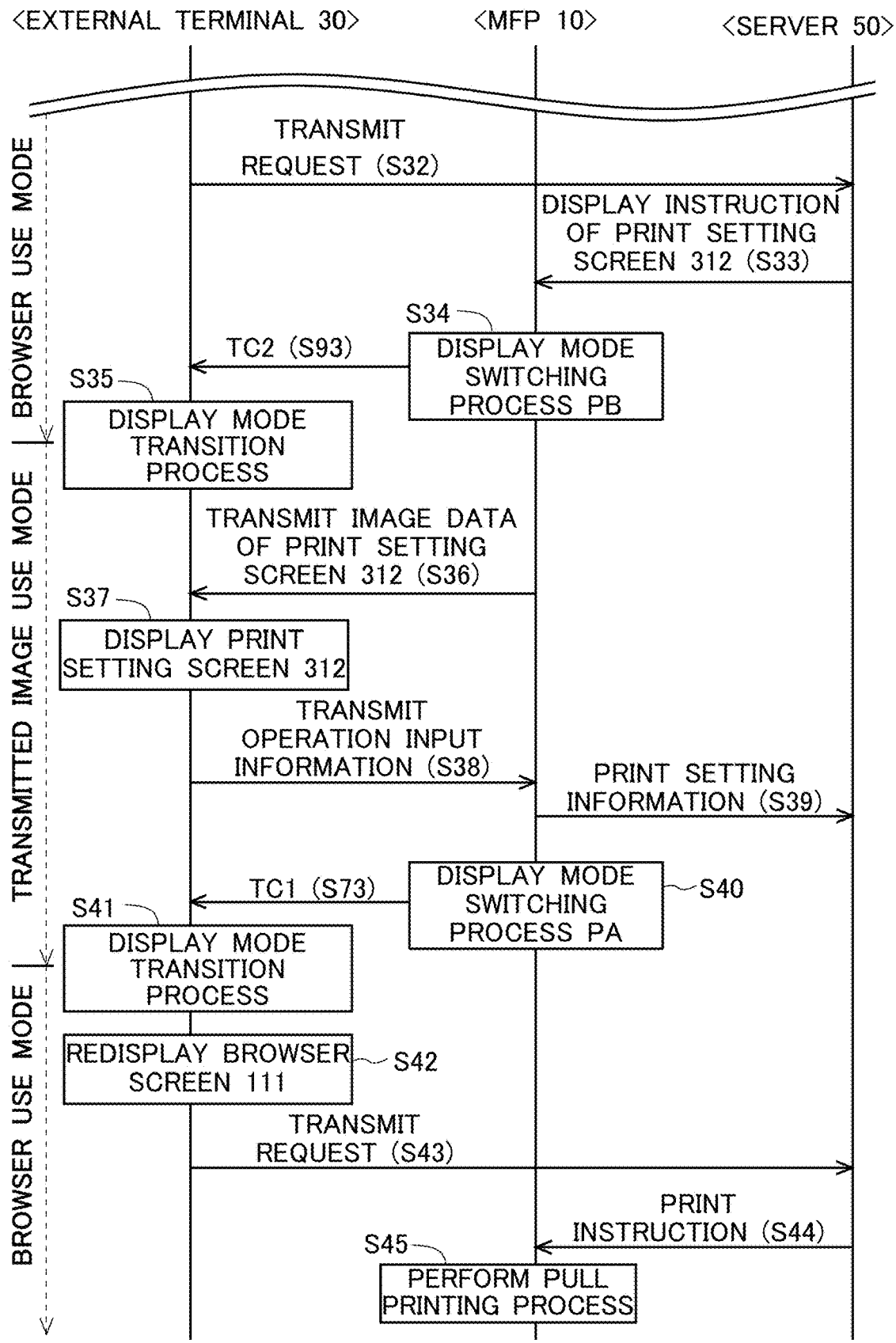

FIGS. 7 and 8 are sequence diagrams showing an operation of the remote operation system 1. With reference to FIGS. 7 and 8, discussion will be made on an operation of the remote operation system 1.

Herein, discussion will be made on a manner in which any one of the display modes of the external terminal 30 is appropriately used when the pull printing process (server cooperation process) is performed by using the remote operation technique in which the external terminal 30 remotely operates the MFP 10.

Hereinafter, the operation of the remote operation system 1 is broadly divided into four stages and discussion will be individually made on these four stages. Specifically, the four stages are:

(1) remote operation starting stage;
(2) server cooperation process starting stage;
(3) specific event occurrence stage; and
(4) return stage.

<Remote Operation Starting Stage>

First, discussion will be made on (1) remote operation starting stage (Steps S11 to S19 of FIG. 7). In this stage, first, after the external terminal 30 starts a remote operation of the MFP 10, the display mode of the external terminal 30 is set to the transmitted image use mode MD2. Then, in the transmitted image use mode MD2, an initial screen 310 (FIG. 11) (discussed later) is displayed on the touch panel 70 of the external terminal 30. After that, when an operation input to the initial screen 310 is received, a server cooperation process selection screen 311 (see FIG. 12) (discussed later) is displayed on the touch panel 70 of the external terminal 30 as the next remote operation screen while the transmitted image use mode MD2 is kept.

Specifically, first, when a program module (one of a plurality of program modules constituting the program P20 installed in the external terminal 30) to be used for the remote operation of the MFP 10 is started in the external terminal 30, the communication control part 63 of the external terminal 30 transmits a remote connection request to the MFP 10 (Step S11). The MFP 10 performs connection with the external terminal 30 in response to the remote connection request (Step S12). A remote communication connection between the MFP 10 and the external terminal 30 is thereby established.

When the remote communication connection is established, the display control part 65 of the external terminal 30 performs a display mode transition process (Step S13). Specifically, the display control part 65 sets the display mode of the external terminal 30 to the transmitted image use mode MD2.

On the other hand, the MFP 10 records the display mode of the external terminal 30 into the display mode information 150 (see FIG. 3) (Step S14). Specifically, the MFP 10 records "transmitted image use mode" into the first line of the display mode information 150 in the storage part 5 (see FIG. 3).

Figure 11:
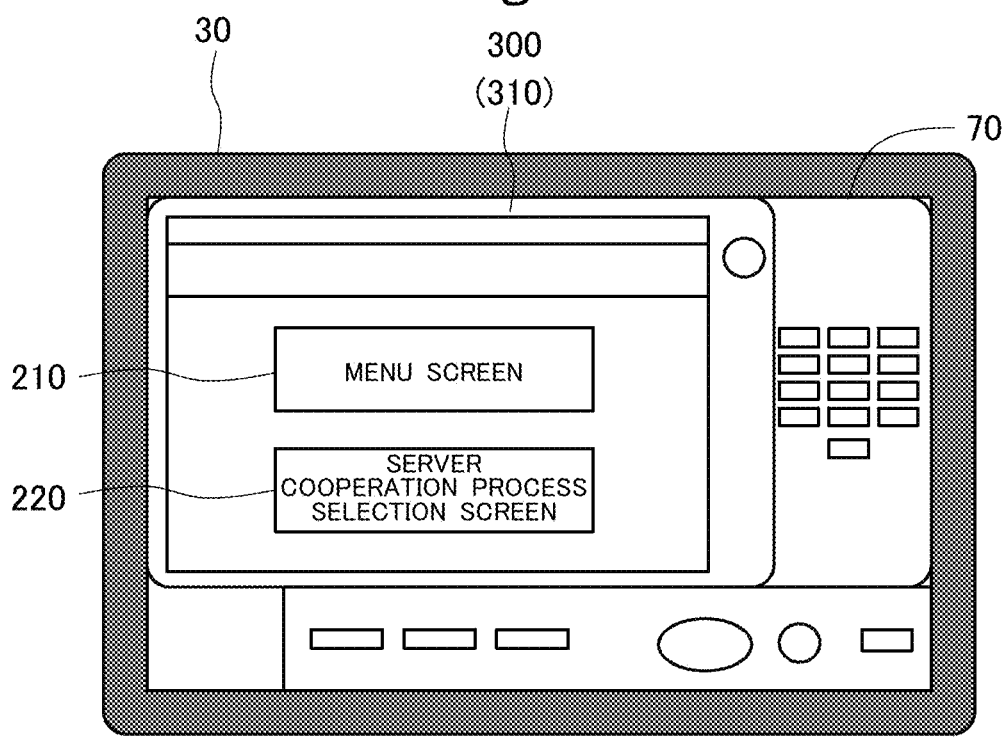
FIG. 11 is a view showing an initial screen.

After that, the MFP 10 generates image data (in more detail, bitmap data) of the initial screen 310 (FIG. 11). Then, the communication control part 11 of the MFP 10 transmits the image data to the external terminal 30 (Step S15).

In response to this, the communication control part 63 of the external terminal 30 receives the image data transmitted from the MFP 10. Then, the display control part 65 of the external terminal 30 displays the initial screen 310 (FIG. 11) on the basis of the image data (bitmap data) on the touch panel 70 as the remote operation screen (Step S16).

As shown in FIG. 11, the initial screen 310 includes buttons 210, 220, and the like. The button 210 is a button used for giving a display instruction for a menu screen (not shown). The button 220 is a button used for giving a display instruction for the server cooperation process selection screen 311 discussed later (see FIG. 12). Herein, it is assumed that an operation input (press operation) of the button 220 given by an operator of the external terminal 30 is received. When the operation input for the button 220 is received, the external terminal 30 generates operation input information M1 on the operation input. Then, the communication control part 63 of the external terminal 30 transmits the operation input information M1 to the MFP 10 (Step S17).

The communication control part 11 of the MFP 10 receives the operation input information M1 from the external terminal 30. Then, the MFP 10 generates image data (in more detail, bitmap data) of the server cooperation process selection screen 311 (FIG. 12) on the basis of the operation input information M1. After that, the communication control part 11 of the MFP 10 transmits the image data to the external terminal 30 (Step S18).

In response to this, the communication control part 63 of the external terminal 30 receives the image data transmitted from the MFP 10. Then, the display control part 65 of the external terminal 30 displays the server cooperation process selection screen (transmitted image screen) 311 (FIG. 12) on the basis of the image data (bitmap data) on the touch panel 70 as the remote operation screen (Step S19).

Figure 12:
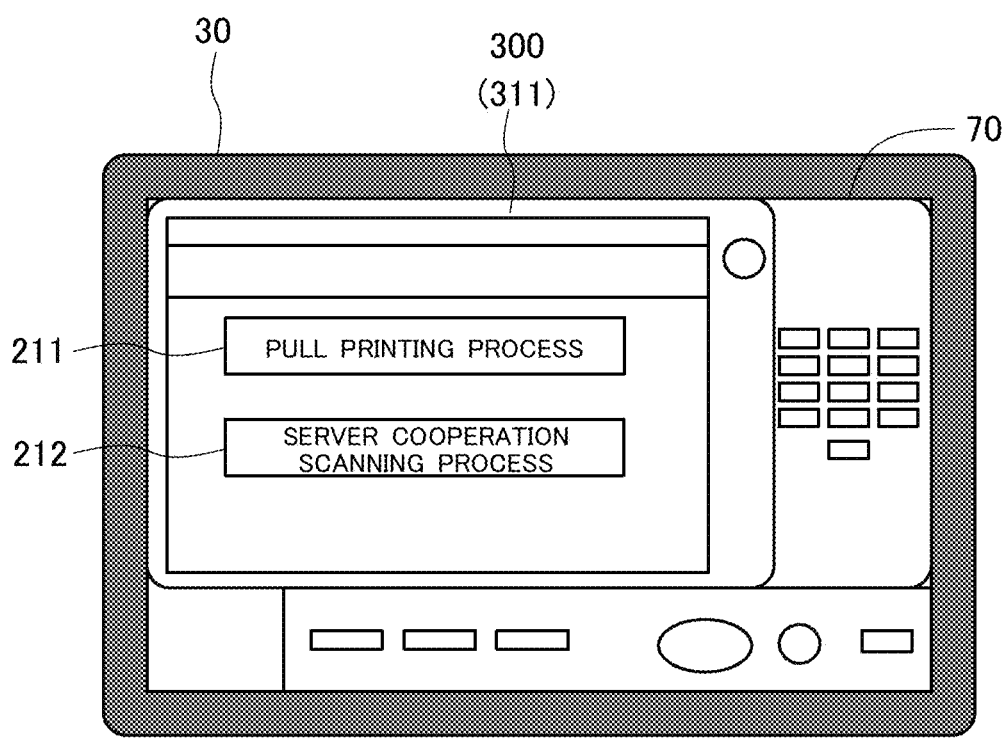
FIG. 12 is a view showing a server cooperation process selection screen.

The server cooperation process selection screen 311 is a screen used for selecting a desired server cooperation process out of a plurality of server cooperation processes and giving an execution start instruction for the server cooperation program to execute the desired server cooperation process. Specifically, as shown in FIG. 12, the server cooperation process selection screen 311 includes buttons 211, 212, and the like. The button 211 is a button used for giving an execution start instruction for the pull printing process. The button 212 is a button used for giving an execution start instruction for the server cooperation scanning process.

<Server Cooperation Process Starting Stage>

Next, discussion will be made on (2) server cooperation process starting stage (Steps S20 to S28 of FIG. 7). In this stage, first, the MFP 10 notifies the external terminal 30 of a transition command TC1 indicating that the display mode of the external terminal 30 should be changed from the transmitted image use mode MD2 to the browser use mode MD1 when the pull printing process is performed. Then, the display control part 65 of the external terminal 30 changes the display mode to the browser use mode MD1 in response to the transition command TC1. Subsequently, the display control part 65 displays the browser screen 111 (see FIG. 13) (discussed later) as the remote operation screen, on the basis of the browser communication data acquired by using the web browser part 37 of the external terminal 30.

Specifically, when the operation input for the button 211 is received in the server cooperation process selection screen 311 (see FIG. 12), the communication control part 63 of the external terminal 30 transmits the operation input information M1 on the operation input to the MFP 10 (Step S20).

In response to this, the communication control part 11 of the MFP 10 receives the operation input information M1 from the external terminal 30. After that, the determination part 15 of the MFP 10 determines whether or not the execution start instruction for the server cooperation process was given, on the basis of the operation input information M1. Specifically, the determination part 15 of the MFP 10 determines whether the button 211 corresponding to the pull printing process was pressed, on the basis of coordinate information M2 included in the operation input information M1. When it is determined that the button 211 was pressed, the determination part 15 of the MFP 10 determines that the execution start instruction for the pull printing process was given. Then, the determination part 15 of the MFP 10 makes a determination that the browser use mode MD1 should be used as the display mode of the external terminal 30.

After that, the MFP 10 performs a display mode switching process PA (see FIG. 9) (Step S21). The display mode switching process PA is a process of switching the display mode of the external terminal 30 from the transmitted image use mode MD2 to the browser use mode MD1.

Figure 9:
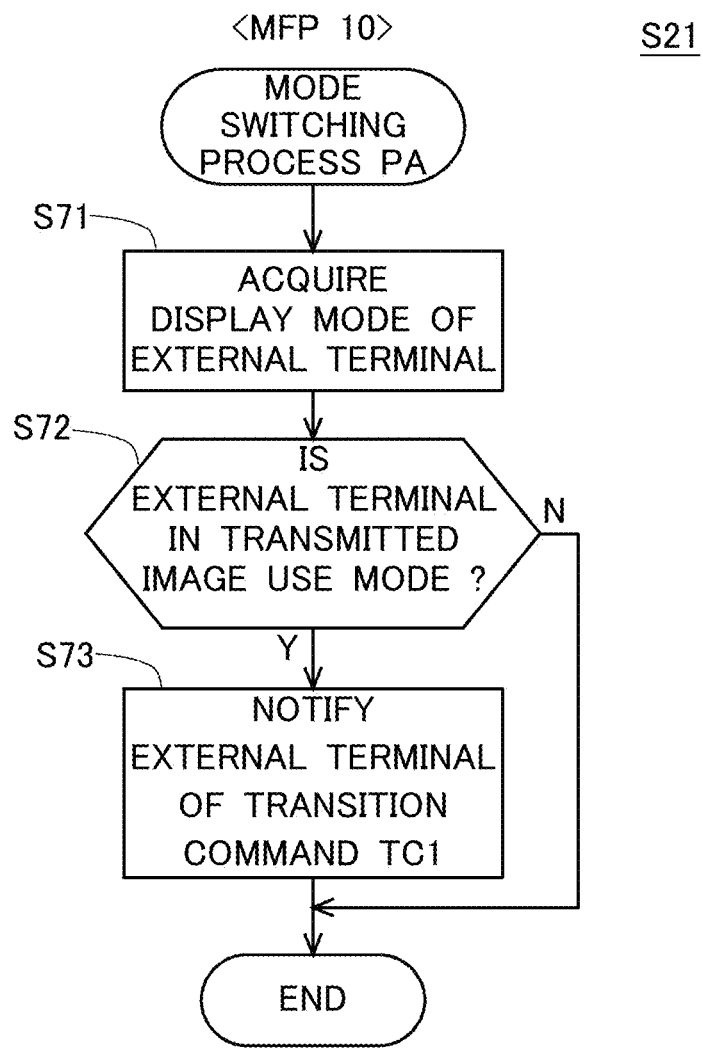
FIGS. 9 and 10 are flowcharts each showing an operation of the remotely-operated apparatus.

Specifically, in Step S71 of FIG. 9, first, the acquisition part 12 of the MFP 10 acquires the display mode of the external terminal 30 by reference to the display mode information 150. In this case, the transmitted image use mode MD2 is acquired as the display mode of the external terminal 30.

In Step S72, the MFP 10 determines whether or not the display mode of the external terminal 30 is the transmitted image use mode MD2. When it is determined that the display mode of the external terminal 30 is the transmitted image use mode MD2, the process goes to Step S73, and otherwise the process is ended. In this case, it is determined that the display mode of the external terminal 30 is the transmitted image use mode MD2, and the process goes to Step S73.

In Step S73, the determination part 15 of the MFP 10 makes a determination that the browser use mode MD1 should be used as the display mode of the external terminal 30. Then, the first notification part 17 of the MFP 10 notifies the external terminal 30 of the transition command TC1 indicating that the display mode of the external terminal 30 should be changed to the browser use mode MD1. Further, the MFP 10 updates "the display mode of the external terminal 30" registered in the display mode information 150 in the storage part 5. Specifically, the MFP 10 updates the display mode of the external terminal 30 associated with the identification number "1" of the external terminal 30 from the "transmitted image use mode" to the "browser use mode".

On the other hand, the communication control part 63 of the external terminal 30 receives the transition command TC1 from the MFP 10. Then, the display control part 65 of the external terminal 30 performs the display mode transition process in response to the transition command TC1 (Step S22 of FIG. 7). Specifically, the display control part 65 changes the display mode of the external terminal 30 from the transmitted image use mode MD2 to the browser use mode MD1 in response to the transition command TC1.

Further, the MFP 10 executes the pull printing program P11, to thereby start the pull printing process. Specifically, first, the communication control part 11 of the MFP 10 establishes a session SN1 of communication between the MFP 10 and the server 50 in response to the execution start instruction for the pull printing process (Step S23).

In more detail, the communication control part 11 uses the SOAP message generation part of the communication part 4 to generate a SOAP message for notifying a connection request and transmits the message to the server 50. In response to this, the server 50 uses a SOAP message interpretation part of the communication part 54 to interpret the SOAP message from the MFP 10 and receives the connection request. Then, the server 50 uses a SOAP message generation part of the communication part 54 to generate a SOAP message for notifying a connection permission and transmits the message (back) to the MFP 10. On the other hand, the MFP 10 uses the SOAP message interpretation part of the communication part 4 to interpret the SOAP message from the server 50 and receives the connection permission. The session SN1 of communication between the MFP 10 and the server 50 is thereby established. The communication control part 11 of the MFP 10 also receives a session ID of the session SN1, as well as the connection permission, from the server 50.

When the session SN1 is established, the communication control part 11 of the MFP 10 transmits an initial URL and the session ID of the session SN1 to the external terminal 30 (Step S24).

On the other hand, the communication control part 63 of the external terminal 30 receives the initial URL and the session ID of the session SN1 from the MFP 10. Further, as discussed later, when the external terminal 30 makes communication with the server 50, the communication control part 63 of the external terminal 30 controls the communication with the server 50 by using the session ID of the session SN1. The server 50 can thereby identify the access from the external terminal 30 (like the access from the MFP 10) in the pull printing process as normal.

Further, the external terminal 30 also starts up the web browser part 37 of the external terminal 30 in response to the transition command TC1. Then, the communication control part 63 of the external terminal 30 establishes a session SN2 of communication with the server 50 (Step S25).

When the session SN2 is established, the communication control part 63 of the external terminal 30 transmits an HTTP request RQ 1 requesting the browser screen 111 (see FIG. 13) to the server 50 by using the initial URL (Step S26).

The communication control part 71 of the server 50 receives the HTTP request RQ1 transmitted from the external terminal 30. Then, the communication control part 71 of the server 50 transmits data of the browser screen 111 (back) to the external terminal 30 as an HTTP response RP1 (Step S27).

In response to this, the communication control part 63 of the external terminal 30 receives the HTTP response RP1 by using the session SN2.

Thus, when the pull printing process is performed, the communication control part 63 of the external terminal 30 directly receives the browser communication data (in more detail, the HTTP response RP1) from the external terminal 30 by using the session SN2, not through the MFP 10. Further, the HTTP response RP1 is received through HTTP communication. The amount of data communication (data traffic) for reception of the HTTP response RP1 based on text is much smaller than that for reception of the image data itself such as bitmap data or the like.

Figure 13:
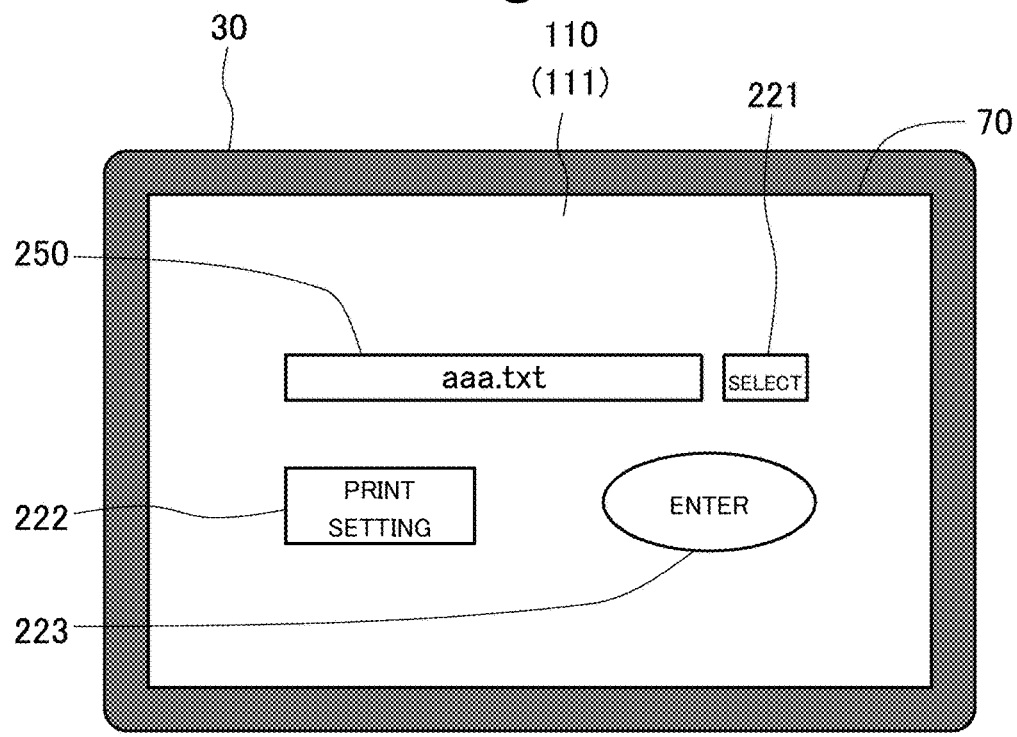
FIG. 13 is a view showing a browser screen.

When the HTTP response RP1 is received, as shown in FIG. 13, the display control part 65 of the external terminal 30 displays the browser screen 111 generated on the basis of the HTTP response RP1 on the touch panel 70 (Step S28).

FIG. 13 is a view showing the browser screen 111. As shown in FIG. 13, the browser screen 111 includes buttons 221 to 223, a box 250, and the like.

The button 221 is a button used for calling a print data selection screen 112 (see FIG. 14) (discussed later). When the button 221 is pressed, the print data selection screen 112 is displayed on the touch panel 70 (see FIG. 14) while the browser use mode MD1 is kept as the display mode of the external terminal 30.

Figure 14:
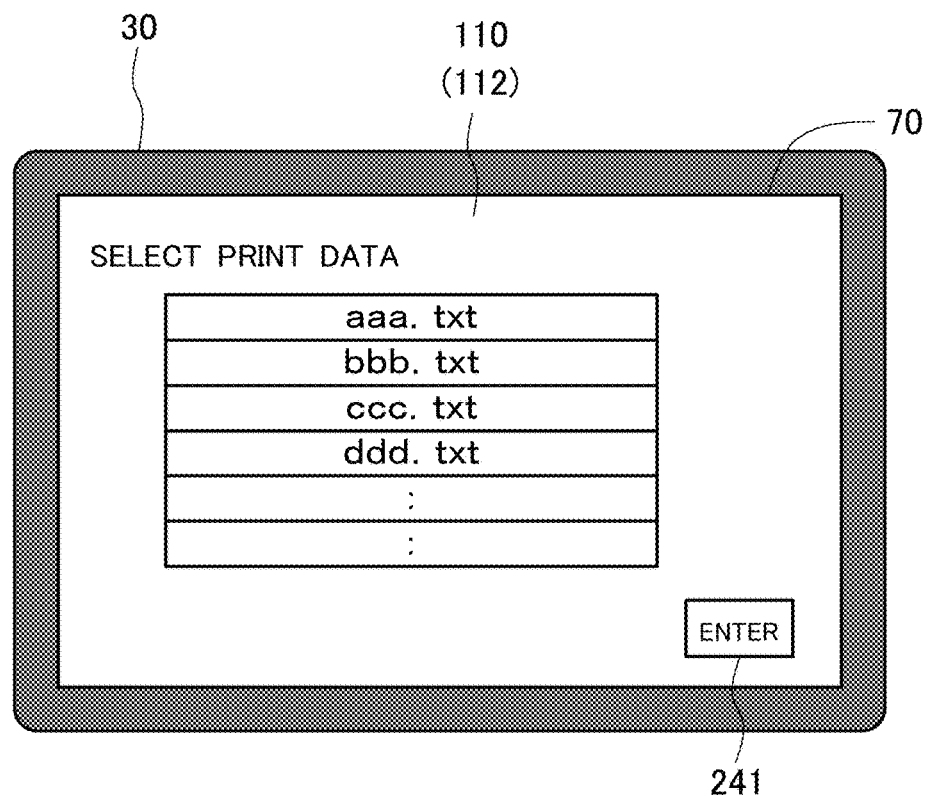
FIG. 14 is a view showing a print data selection screen.

The print data selection screen 112 is a screen in which data to be printed can be selected out of print data PD1, PD2, . . . stored in the server 50. Specifically, as shown in FIG. 14, respective file names ("aaa.txt", "bbb.txt", . . . ) of the print data PD1, PD2, . . . are listed in a selectable manner in the print data selection screen 112. Then, when a specific file name is selected in the print data selection screen and the button 241 is pressed, the print data corresponding to the specific file name is selected as the data to be printed.

When the print data PD1 ("aaa.txt") is selected, for example, through the print data selection screen 112, the print data PD1 is selected as the data to be printed and the file name "aaa.txt" of the print data PD1 is displayed in the box 250 (see FIG. 13). Further, the data of the print data selection screen 112, like the data of the browser screen 111, is received as an HTTP response through HTTP connection between the external terminal 30 and the server 50.

Referring back to FIG. 13, discussion will be made on the browser screen 111.

The button 222 is a button used for displaying a print setting screen 312 (see FIG. 15) (discussed later).

The button 223 is a button used for receiving a print instruction. When the button 223 is pressed, pull printing (printing) of the print data PD1 selected through the above-discussed print data selection screen 112 (see FIG. 14) is performed.

As discussed above, in the preferred embodiment, in response to the execution start instruction for the pull printing process (server cooperation process), the external terminal 30 is notified of the transition command TC1 and the display mode of the external terminal 30 is changed to the browser use mode MD1. After that, in response to the HTTP request from the external terminal 30, the HTTP response is transmitted from the server 50 to the external terminal 30 and the browser screen 111 based on the HTTP response (browser communication data) is displayed on the touch panel 70 of the external terminal 30 as the remote operation screen (see FIG. 13).

Thus, in the pull printing process using the remote operation technique, instead of transmission of the image data (bitmap data) to the external terminal 30, the browser communication data (HTTP response) having less amount of data communication than that of the image data is transmitted to the external terminal 30. Since the image data to be transmitted to the external terminal 30 is thereby reduced, it is possible to suppress the communication traffic between the external terminal 30 and any other apparatus as compared with the case where the image data itself is transmitted.

After the above-discussed pull printing process is started, the display mode of the external terminal 30 is changed to the browser use mode MD1 and in principle, the browser screen based on the browser communication data (HTTP response) generated by the server 50 is used as the remote operation screen.

In the above-discussed pull printing process, however, it can be supposed that there is a condition where it is preferable to use a specific setting screen based on the image data generated by the MFP 10, as the remote operation screen. For example, in order to make setting on a printout in the above-discussed pull printing process, it is convenient to use the print setting screen 312 based on the image data generated by the MFP 10 because using of the image data of the print setting screen 312, which is stored in the MFP 10, eliminates the necessity of separately generating the browser communication data of the screen corresponding to the print setting screen 312 in the server 50.

In the browser use mode MD1, however, the browser communication data (HTTP response) received from the server 50 can be used but the image data (bitmap data) transmitted from the MFP 10 cannot be used. For this reason, there arises a problem that the specific setting screen based on the image data (bitmap data) transmitted from the MFP 10 cannot be displayed on the external terminal 30 when the display mode of the external terminal 30 is the browser use mode MD1.

Further, in the browser use mode MD1, communication between the external terminal 30 and the server 50 is performed but no communication between the external terminal 30 and the MFP 10 is performed. For this reason, there also arises a problem that the transmission command indicating that the image data generated by the MFP 10 should be transmitted to the external terminal 30 cannot be directly transmitted from the external terminal 30 to the MFP 10 when the display mode of the external terminal 30 is the browser use mode MD1.

Then, the remote operation system 1 of the preferred embodiment performs such an operation as shown in the following discussion on (3) specific event occurrence stage. Specifically, the server 50 detects the display request for the print setting screen 312 from the external terminal 30 and transmits a message including the transmission command indicating that the image data of the print setting screen 312 should be transmitted to the external terminal 30, to the MFP 10 when the display mode of the external terminal 30 is the browser use mode MD1. In response to this, the MFP 10 detects the transmission of the transmission command from the server 50 as occurrence of a specific event outside the MFP 10 and transmits the transition command TC2 to the external terminal 30. Then, the external terminal 30 changes the display mode thereof to the transmitted image use mode MD2 and displays the print setting screen 312 on the touch panel 70 of the external terminal 30, on the basis of the image data transmitted form the MFP 10. It is thereby possible to reliably display the print setting screen 312 on the touch panel 70 of the external terminal 30 even if the transmission command for the image data of the print setting screen 312 is detected when the display mode of the external terminal 30 is the browser use mode MD1. Then, the user of the external terminal 30 can continue the pull printing process (server cooperation process) through the print setting screen 312.

<Specific Event Occurrence Stage>

Subsequently, discussion will be made on (3) specific event occurrence stage (Steps S32 to S37 of FIG. 8). In this stage, first, the transmission of the transmission command for the image data (bitmap data) of the print setting screen 312 from the server 50 is detected as occurrence of an specific event outside the MFP 10 and the external terminal 30 is notified of the transition command TC2. After that, the display mode of the external terminal 30 is changed to the transmitted image use mode MD2 and the print setting screen 312 based on the image data transmitted from the MFP 10 is displayed on the touch panel 70 as the remote operation screen.

Specifically, after the print data PD1 is selected through the above-discussed print data selection screen 112 (see FIG. 14), when the button 222 in the browser screen 111 (see FIG. 13) is pressed, the communication control part 63 of the external terminal 30 transmits an HTTP request RQ2 including the display request for the print setting screen 312 to the server 50 (Step S32).

The communication control part 71 of the server 50 receives the HTTP request RQ2 transmitted from the external terminal 30. Then, the request detection part 73 of the server 50 analyzes the HTTP request RQ2 and detects the display request for the print setting screen 312 in the MFP 10. The server 50 uses the SOAP message generation part of the communication part 54 to generate a SOAP message MS1 for notifying the transmission command indicating that image data of the print setting screen 312 should be transmitted to the external terminal 30. Then, the communication control part 71 of the server 50 transmits the SOAP message MS1 to the MFP 10 (Step S33). Thus, when the request detection part 73 detects the display request for the print setting screen 312, the communication control part 71 of the server 50 transmits the message (SOAP message MS1) including the transmission command indicating that image data of the print setting screen 312 should be transmitted to the external terminal 30, to the MFP 10.

Figure 10:
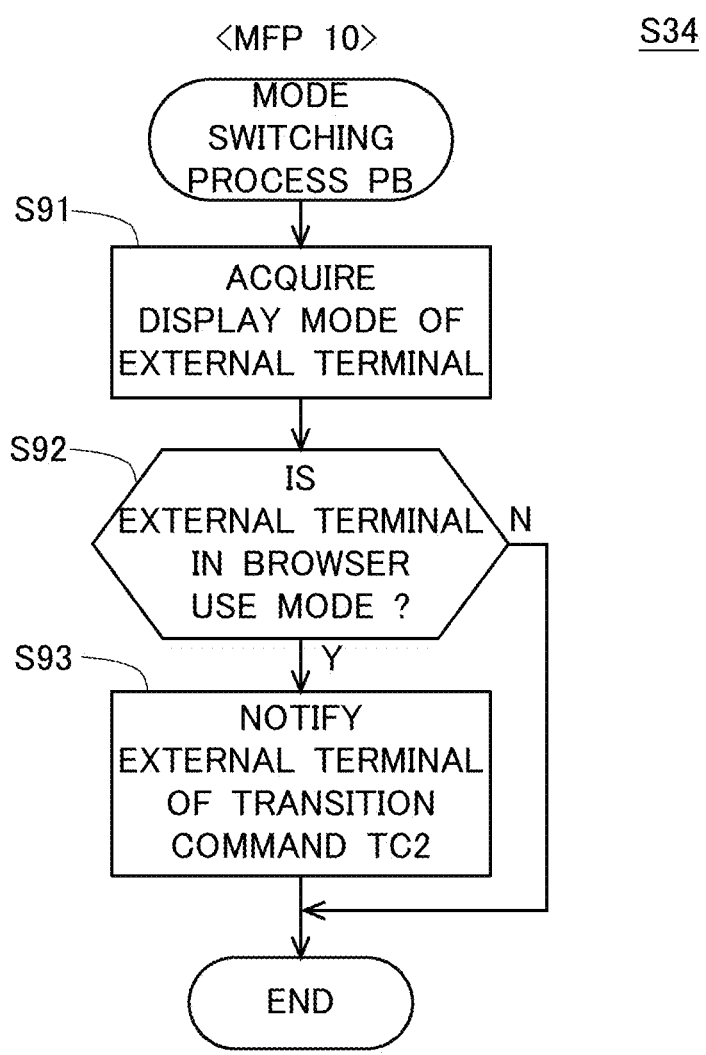

In response to this, the communication control part 11 of the MFP 10 receives the SOAP message MS1 from the external terminal 30 by using the session SN1 and uses the SOAP message interpretation part of the communication part 4 to interpret the SOAP message MS1. At that time, when the SOAP message MS1 is interpreted to be the transmission command for the image data of the print setting screen 312, the detection part 14 of the MFP 10 detects the transmission of the transmission command from the server 50 as occurrence of a specific event outside the MFP 10. In other words, the detection part 14 of the MFP 10 detects the transmission command for the image data of the print setting screen 312 from the server 50 as the specific event outside the MFP 10. Further, the determination part 15 of the MFP 10 makes a determination that the transmitted image use mode MD2 should be used as the display mode of the external terminal 30. Then, the MFP 10 performs the display mode switching process PB (see FIG. 10) (Step S34). The display mode switching process PB is a process of switching the display mode of the external terminal 30 from the browser use mode MD1 to the transmitted image use mode MD2.

Specifically, in Step S91, first, the acquisition part 12 of the MFP 10 acquires the display mode of the external terminal 30 by reference to the display mode information 150. In this case, the browser use mode MD1 is acquired as the display mode of the external terminal 30.

In Step S92, the MFP 10 determines whether or not the display mode of the external terminal 30 is the browser use mode MD1. When it is determined that the display mode of the external terminal 30 is the browser use mode MD1, the process goes to Step S93 and otherwise the process is ended. In this case, it is determined that the display mode of the external terminal 30 is the browser use mode MD1, and the process goes to Step S93.

In Step S93, the determination part 15 of the MFP 10 makes a determination that the transmitted image use mode MD21 should be used as the display mode of the external terminal 30. Then, the second notification part 18 of the MFP 10 notifies the external terminal 30 of the transition command TC2 indicating that the display mode of the external terminal 30 should be changed to the transmitted image use mode MD2. Further, the MFP 10 updates "the display mode of the external terminal 30" registered in the display mode information 150 in the storage part 5. Specifically, the MFP 10 updates the display mode of the external terminal 30 associated with the identification number "1" of the external terminal 30 from the "browser use mode" to the "transmitted image use mode".

On the other hand, the communication control part 63 of the external terminal 30 receives the transition command TC2 from the MFP 10. Then, the display control part 65 of the external terminal 30 performs the display mode transition process in response to the transition command TC2 (Step S35 of FIG. 8). Specifically, the display control part 65 changes the display mode of the external terminal 30 from the browser use mode MD1 to the transmitted image use mode MD2 in response to the transition command TC2.

After that, the MFP 10 generates the image data (in more detail, bitmap data) of the transmitted image screen (print setting screen) 312. Then, the communication control part 11 of the MFP 10 transmits the image data to the external terminal 30 (Step S36).

In response to this, the communication control part 63 of the external terminal 30 receives the image data (in more detail, bitmap data) of the print setting screen 312 transmitted from the MFP 10. Then, the display control part 65 of the external terminal 30 displays the print setting screen (transmitted image screen) 312 (FIG. 15) on the touch panel 70, on the basis of the image data (see FIG. 15) (Step S37). Thus, after the transition to the transmitted image use mode MD2, the display control part 65 of the external terminal 30 displays the print setting screen (transmitted image screen) 312 as the remote operation screen, on the basis of the image data (in more detail, bitmap data) transmitted from the MFP 10. Therefore, when the transmission command for the image data of the print setting screen 312 is received, even if the display mode of the external terminal 30 is the browser use mode MD1, since the display mode of the external terminal 30 is changed to the transmitted image use mode MD2, it is possible to reliably display the print setting screen 312 on the touch panel 70 of the external terminal 30.

<Return Stage>

Finally, discussion will be made on (4) return stage (Steps S38 to S45 of FIG. 8). In this stage, first, within a period while the display mode of the external terminal 30 is changed to the transmitted image use mode MD2 in response to the transition command TC2 (command indicating that the display mode should be changed from the browser use mode MD1 to the transmitted image use mode MD2), a predetermined instruction DR is received. In response to the predetermined instruction DR, the instruction indicating that transition to the browser use mode MD1 should be performed is registered in advance in the storage part 5 of the MFP 10. Then, in response to the predetermined instruction DR, the MFP 10 makes a determination that the browser use mode should be used as the display mode of the external terminal 30 and notifies the external terminal 30 of the transition command TC1 (command indicating that the display mode should be changed from the transmitted image use mode MD2 to the browser use mode MD1). In response to this, the display control part 65 of the external terminal 30 changes the display mode to the browser use mode MD1 in response to the transition command TC1 and displays the browser screen 111 which was displayed immediately before the print setting screen 312, on the touch panel 70 again.

Figure 15:
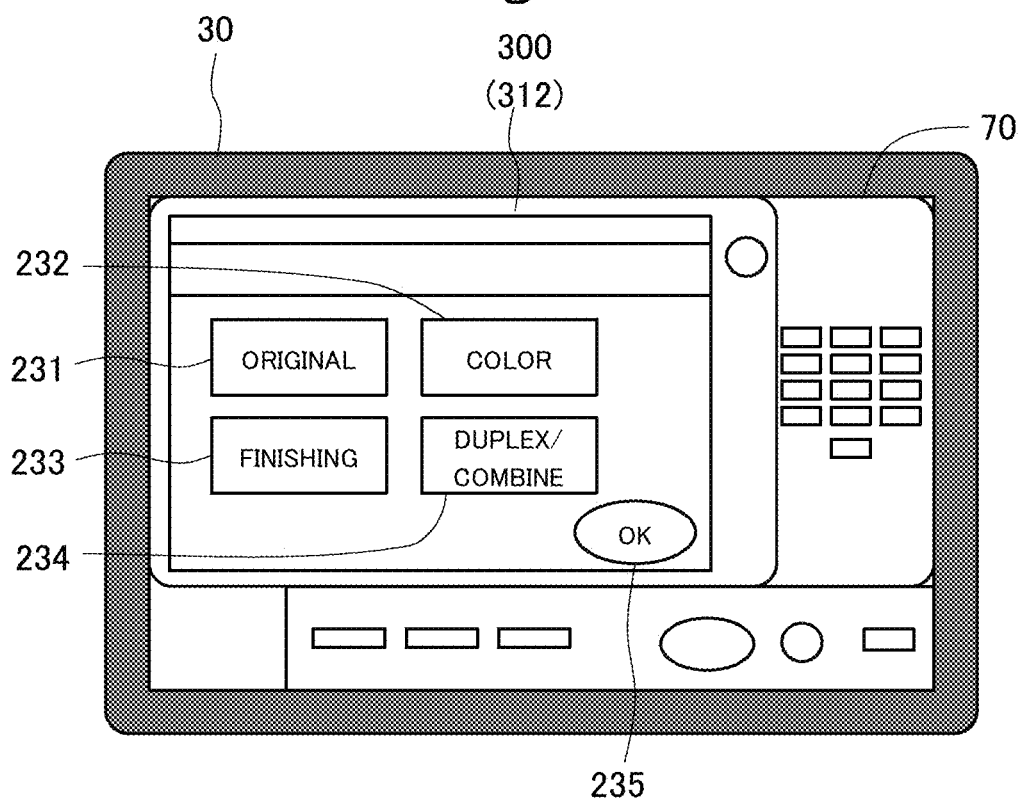
FIG. 15 is a view showing a print setting screen.

FIG. 15 is a view showing the print setting screen 312. As shown in FIG. 15, the print setting screen 312 includes the buttons 231 to 235.

The buttons 231 to 234 are buttons for receiving the display instructions indicating that setting screens SS1 to SS4 (not shown) for setting items ("Original", "Color", "Finishing", and "Duplex/Combine") should be displayed, respectively. Further, like the print setting screen 312, the setting screens SS1 to SS4 are also screens to be displayed on the touch panel 70 of the external terminal 30 on the basis of the image data from the MFP 10 in the transmitted image use mode MD2.

Furthermore, the button 235 is a button for confirming (reflecting) the print setting contents changed in the above-discussed setting screens SS1 to SS4 (not shown). The button 235 is also a button for receiving an instruction to confirm the print setting content as the predetermined instruction DR.

After the print setting contents are changed through the above-discussed setting screens SS1 to SS4 (not shown), when the button 235 in the print setting screen 312 is pressed, the communication control part 63 of the external terminal 30 transmits the operation input information M1 of the print setting screen 312 to the MFP 10 (Step S38).

In response to this, the communication control part 11 of the MFP 10 receives the operation input information M1 from the external terminal 30 and transmits the latest print setting information changed through the above-discussed setting screens SS1 to SS4 (not shown) to the server 50 (Step S39).

The server 50 receives the latest print setting information from the MFP 10 and updates the current print setting information to the latest print setting information.

Further, the determination part 15 of the MFP 10 determines, on the basis of the operation input information M1, whether or not an instruction to confirm the print setting contents is given as the predetermined instruction DR by the user within a period of use of the transmitted image use mode MD2 in accordance with the transition command TC2. Specifically, the determination part 15 of the MFP 10 determines whether or not the button 235 in the print setting screen 312 is pressed, on the basis of the coordinate information M2 included in the operation input information M1. Then, when it is determined that the button 235 is pressed (in other words, the predetermined instruction DR is given), the determination part 15 of the MFP 10 makes a determination that the browser use mode MD1 should be used as the display mode of the external terminal 30.

After that, the MFP 10 performs the above-discussed display mode switching process PA (see FIG. 9) again (Step S40) and causes the external terminal 30 to change the display mode thereof from the transmitted image use mode MD2 to the browser use mode MD1.

With this operation, "the display mode of the external terminal 30" registered in the display mode information 150 in the storage part 5 is updated from the "transmitted image use mode" to the "browser use mode". Further, the external terminal 30 preforms the display mode transition process (Step S41) and the display mode of the external terminal 30 is changed from the transmitted image use mode MD2 to the browser use mode MD1. Then, the browser screen 111 (see FIG. 13) which was displayed immediately before the transmitted image screen (print setting screen) 312 is displayed on the touch panel 70 of the external terminal 30 again (Step S42).

After that, when the button 223 in the browser screen 111 is pressed, the communication control part 63 of the external terminal 30 transmits an HTTP request RQ3 which is an instruction on printing of the print data PD1, to the server 50 (Step S43).

The communication control part 71 of the server 50 receives the HTTP request RQ3 transmitted from the external terminal 30. In response to the HTTP request RQ3, the server 50 uses the SOAP message generation part of the communication part 54 to generate a SOAP message MS2 which is an instruction on printing of the print data PD1 selected by the user. Then, the communication control part 71 of the server 50 transmits the SOAP message MS2 to the MFP 10 (Step S44).

On the other hand, the communication control part 11 of the MFP 10 receives the SOAP message MS2. Then, the MFP 10 uses the SOAP message interpretation part of the communication part 4 to interpret the SOAP message MS2. When the SOAP message MS2 is interpreted, the MFP 10 performs pull printing of the print data PD1 (Step S45). Specifically, the communication control part 11 of the MFP 10 acquires (pulls) the print data PD1 stored in the storage part 55 of the server 50. Then, the printing part 3 of the MFP 10 prints out the print data PD1.

Thus, the operations (1) to (4) are performed in the remote operation system 1.

2. Variations

Though the preferred embodiment of the present invention has been discussed above, the present invention is not limited to the above-discussed preferred embodiment.

For example, though the case has been discussed where the pull printing process is performed in the above-discussed preferred embodiment, the present invention is not limited to the pull printing process and the server cooperation scanning process may be performed.

Specifically, when the button 212 in the server cooperation process selection screen 311 (see FIG. 12) is pressed, the communication control part 63 of the external terminal 30 transmits the operation input information M1 to the MFP 10. On the other hand, the determination part 15 of the MFP 10 determines, on the basis of the operation input information M1, that the button 221 in the server cooperation process selection screen 311 is pressed and the execution start instruction for the server cooperation scanning process is given. Then, the first notification part 17 of the MFP 10 notifies the external terminal 30 of the transition command TC1. In response to this, the display control part 65 of the external terminal 30 changes the display mode of the external terminal 30 to the browser use mode MD1 in response to the transition command TC1 and displays the browser screen on the touch panel 70. Such an operation as discussed above may be performed.

Further, though the case has been discussed where the transmission command indicating that the image data of the print setting screen 312 (see FIG. 15) should be transmitted to the external terminal 30 is detected as the specific event outside the MFP 10 in the above-discussed preferred embodiment, the present invention is not limited to this case. For example, a specific error (an error such as paper-out condition, toner-out condition, or the like) in the MFP 10 may be detected as a specific event inside the MFP 10.

Specifically, when an error of which the user should be notified (hereinafter, referred to also as a notification-needed error), such as paper jam, toner-out, paper-out, or the like occurs in the MFP 10 as a specific error, the detection part 14 of the MFP 10 detects the occurrence of the notification-needed error as the occurrence of the specific event inside the MFP 10. In other words, the detection part 14 detects the notification-needed error as the specific event inside the MFP 10. Then, when the specific event (notification-needed error) inside the MFP 10 is detected, the second notification part 18 of the MFP 10 notifies the external terminal 30 of the transition command TC2 indicating that the display mode of the external terminal 30 should be changed from the browser use mode MD1 to the transmitted image use mode MD2. In response to this, the display control part 65 of the external terminal 30 changes the display mode of the external terminal 30 to the transmitted image use mode MD2 in response to the transition command TC2. Then, the display control part 65 of the external terminal 30 displays an error screen (not shown) used for notifying the user of the notification-needed error on the touch panel 70, on the basis of the image data transmitted from the MFP 10 in response to the occurrence of the specific event (in other words, the occurrence of the notification-needed error). Such an operation as discussed above may be performed.

When the display mode of the external terminal 30 is the browser use mode MD1, if a notification-needed error occurs in the MFP 10, the display mode is thereby changed to the transmitted image use mode MD2, and it is therefore possible to reliably display the error screen for notifying the user of the notification-needed error, on the external terminal 30.

Further, in detection of such a notification-needed error, only an error which is classified in advance as a hindrance to continuation of the server cooperation process, among various errors in the remotely-operated apparatus, may be detected as the notification-needed error in the MFP 10. In other words, there may be another case where an error which is classified in advance as non-hindrance to the continuation of the server cooperation process is not detected as the notification-needed error in the MFP 10. It is thereby possible to appropriately notify the user of occurrence of the error to be a hindrance to the continuation of the server cooperation process. Further, it is also possible to prevent the server cooperation process from being interrupted (prevent the continuation of the server cooperation process from being hindered) due to occurrence of an error which is not a hindrance to the continuation of the server cooperation process.

In a case where the pull printing process is performed as the server cooperation process, for example, such an operation discussed below may be performed. Specifically, various errors are classified in advance in accordance with whether or not the error causes a hindrance to the continuation of the pull printing process, and at a certain point, the process reflecting the classification result may be performed on the errors occurring in the MFP 10. Further, the classification result may be stored in the storage part 5 of the MFP 10, or the like, as error classification information M3.

In this case, the pull printing process is a process accompanied by printing performed by the printing part 3 and not accompanied by the feed of an original manuscript to the image reading part 2 by an auto document feeder.

When a paper jam error (hereinafter, referred to also as an error ER1) occurs on a paper conveyance path in the printing part 3 while the pull printing process is performed, it is difficult to continue the pull printing process.

On the other hand, even when a paper jam error (hereinafter, referred to also as an error ER2) occurs on an original conveyance path in the auto document feeder while the pull printing process is performed, it is possible to continue the pull printing process.

On the basis of such characteristics, the error ER1 is classified in advance as a hindrance to continuation of the pull printing process and stored into the error classification information M3, and the error ER2 is classified in advance as non-hindrance to continuation of the pull printing process and stored into the error classification information M3.

Then, when the error ER1 which causes a hindrance to the continuation of the pull printing process occurs during execution of the pull printing process, the detection part 14 of the MFP 10 detects the error ER1 as the notification-needed error on the basis of the error classification information M3.

Further, when the error ER2 which causes no hindrance to the continuation of the pull printing process occurs during execution of the pull printing process, the detection part 14 of the MFP 10 does not detect the error ER2 as the notification-needed error on the basis of the error classification information M3.

Since the error ER1 which causes a hindrance to the continuation of the pull printing process is detected as the notification-needed error and the error screen for notifying the user of the error ER1 is displayed on the external terminal 30, it is thereby possible to appropriately notify the user of the error ER1. Further, since the error ER2 which causes no hindrance to the continuation of the pull printing process is not detected as the notification-needed error and the error screen for notifying the user of the error ER2 is not displayed on the external terminal 30, it is thereby possible to prevent the continuation of the pull printing process from being hindered.

Further, also in a case where the server cooperation scanning process is performed as the server cooperation process, the same operation as above may be performed. Specifically, various errors are classified in advance in accordance with whether or not the error causes a hindrance to the continuation of the server cooperation scanning process, and at a certain point, the process reflecting the classification result may be performed on the errors occurring in the MFP 10. Further, the classification result may be stored in the storage part 5 of the MFP 10, or the like, as error classification information M3.

In this case, the server cooperation scanning process is a process accompanied by the feed of an original manuscript to the image reading part 2 by an auto document feeder and not accompanied by printing performed by the printing part 3.

Even when the above-discussed error ER1 (paper jam error on a paper conveyance path in the printing part 3) occurs during execution of the server cooperation scanning process, it is possible to continue the server cooperation scanning process.

On the other hand, when the above-discussed error ER2 (paper jam error on an original conveyance path in the auto document feeder) occurs during execution of the server cooperation scanning process, it is difficult to continue the server cooperation scanning process.

On the basis of such characteristics, the error ER1 is classified in advance as non-hindrance to continuation of the server cooperation scanning process and stored into the error classification information M3, and the error ER2 is classified in advance as a hindrance to continuation of the server cooperation scanning process and stored into the error classification information M3.

Then, when the error ER2 which causes a hindrance to the continuation of the server cooperation scanning process occurs during execution of the server cooperation scanning process, the detection part 14 of the MFP 10 detects the error ER2 as the notification-needed error on the basis of the error classification information M3.

Further, when the error ER1 which causes no hindrance to the continuation of the server cooperation scanning process occurs during execution of the server cooperation scanning process, the detection part 14 of the MFP 10 does not detect the error ER1 as the notification-needed error.

Since the error ER2 which causes a hindrance to the continuation of the server cooperation scanning process is detected as the notification-needed error and the error screen for notifying the user of the error ER2 is displayed on the external terminal 30, it is thereby possible to appropriately notify the user of the error ER2. Further, since the error ER1 which causes no hindrance to the continuation of the server cooperation scanning process is not detected as the notification-needed error and the error screen for notifying the user of the error ER1 is not displayed on the external terminal 30, it is thereby possible to prevent the continuation of the server cooperation scanning process from being hindered.

While the invention has been shown and described in detail, the foregoing description is in all aspects illustrative and not restrictive. It is therefore understood that numerous modifications and variations can be devised without departing from the scope of the invention.

What is claimed is:

1. A remote operation system, comprising:
   a remotely-operated apparatus including a first hardware processor;
   an external terminal for remotely operating said remotely-operated apparatus and including a second hardware processor; and
   a server capable of making communication with said remotely-operated apparatus and also capable of making communication with said external terminal,
   wherein said second hardware processor of said external terminal is configured to display a remote operation screen used for remotely operating said remotely-operated apparatus on a display part of said external terminal by selectively using one of a plurality of display modes including a browser use mode and a transmitted image use mode,
   said browser use mode is a mode in which a browser screen which is a display screen based on browser communication data composed of text data acquired from a communication partner that is not routed through the remotely-operated apparatus, by using a browser of said external terminal is displayed,
   said transmitted image use mode is a mode in which a transmitted image screen which is a display screen based on image data transmitted from said remotely-operated apparatus is displayed,
   said first hardware processor of said remotely-operated apparatus is configured to notify said external terminal of a first transition command indicating that a display mode of said external terminal should be changed from said transmitted image use mode to said browser use mode when a server cooperation process which is a cooperation process with said server is performed,
   said second hardware processor of said external terminal changes said display mode to said browser use mode in response to said first transition command and displays said browser screen on the basis of said browser communication data composed of text data acquired by using said browser of said external terminal,
   said first hardware processor of said remotely-operated apparatus is further configured to:
      detect occurrence of a specific event outside said remotely-operated apparatus on the basis of a message from said server, said specific event including transmission from said server of a second transition command indicating that said display mode should be changed from said browser use mode to said transmitted image use mode; and
      notify said external terminal of the second transition command indicating that said display mode should be changed from said browser use mode to said transmitted image use mode when the occurrence of said specific event is detected by said first hardware processor, and
   said second hardware processor of said external terminal changes said display mode to said transmitted image use mode in response to said second transition command and displays said transmitted image screen on the basis of said image data transmitted from said remotely-operated apparatus in response to the occurrence of said specific event.

2. The remote operation system according to claim 1, wherein:
said server has:
a third hardware processor for detecting a display request for a specific setting screen generated by said remotely-operated apparatus in communication with said external terminal; and
a transmitter for transmitting said message to said remotely-operated apparatus when said display request is detected by said third hardware processor, said message including a transmission command indicating that image data of said specific setting screen should be transmitted to said external terminal, said transmission command including said second transmission command,
said first hardware processor of said remotely-operated apparatus detects transmission of said transmission command from said server as the occurrence of said specific event outside said remotely-operated apparatus, and
said second hardware processor of said external terminal displays said transmitted image screen on the basis of said image data transmitted from said remotely-operated apparatus after transition to said transmitted image use mode.

3. The remote operation system according to claim 1, wherein said first hardware processor of said remotely-operated apparatus is further configured to receive said message from said server by using a first session of communication after a session of communication between said remotely-operated apparatus and said server in response to an execution start instruction for said server cooperation process is established as said first session of communication.

4. The remote operation system according to claim 1, wherein said first hardware processor of said remotely-operated apparatus detects occurrence of a specific error in said remotely-operated apparatus as an occurrence of a second specific event inside said remotely-operated apparatus.

5. The remote operation system according to claim 4, wherein said first hardware processor of said remotely-operated apparatus detects an error which is classified in advance as a hindrance to continuation of said server cooperation process, among various errors in said remotely-operated apparatus, as said specific error, and does not detect an error which is classified in advance as non-hindrance to the continuation of said server cooperation process, among various errors in said remotely-operated apparatus, as said specific error.

6. The remote operation system according to claim 5, wherein:
said remotely-operated apparatus further has:
a printing part; and
image reader which receives feed of an original manuscript by an auto document feeder,
said server cooperation process is a process accompanied by printing performed by said printing part and not accompanied by the feed of the original manuscript to said image reader by said auto document feeder, and
said first hardware processor of said remotely-operated apparatus detects a paper jam error on a paper conveyance path in said printing part as said specific error, and does not detect a paper jam error on an original conveyance path in said auto document feeder as said specific error.

7. The remote operation system according to claim 5, wherein:
said remotely-operated apparatus further has:
a printing part; and
image reader which receives feed of an original manuscript by an auto document feeder,
said server cooperation process is a process accompanied by the feed of the original manuscript to said image reader by said auto document feeder and not accompanied by printing performed by said printing part, and
said first hardware processor of said remotely-operated apparatus detects a paper jam error on an original conveyance path in said auto document feeder as said specific error, and does not detect a paper jam error on a paper conveyance path in said printing part as said specific error.

8. The remote operation system according to claim 1, wherein said first hardware processor of said remotely-operated apparatus is further configured to:
determine whether said browser use mode or said transmitted image use mode should be used as said display mode of said external terminal,
determine whether or not an execution start instruction for said server cooperation process was given by a user, on the basis of operation input information received from said external terminal as information on an operation input to said remote operation screen, and when it is determined that said execution start instruction was given, make a determination that said browser use mode should be used as said display mode of said external terminal, and
notify said external terminal of said first transition command when said first hardware processor makes said determination.

9. The remote operation system according to claim 1, wherein said first hardware processor of said remotely-operated apparatus is further configured to:
determine whether said browser use mode or said transmitted image use mode should be used as said display mode of said external terminal,
determine whether or not a predetermined instruction was given by a user within a period of use of said transmitted image use mode in accordance with said second transition command, on the basis of operation input information received from said external terminal as information on an operation input to said remote operation screen by said user, and when it is determined that said predetermined instruction was given, said first hardware processor of said remotely-operated apparatus makes a determination that said browser use mode should be used as said display mode of said external terminal, and
notify said external terminal of said first transition command when said first hardware processor makes said determination.

10. The remote operation system according to claim 1, wherein said remotely-operated apparatus further has a memory for storing therein display mode information in which an identification number for identifying said external terminal and a display mode of said external terminal associated therewith are registered, and
said first hardware processor of said remotely-operated apparatus is further configured to acquire said display mode of said external terminal on the basis of said display mode information.

11. The remote operation system according to claim 1,
wherein said second hardware processor of said external terminal is further configured to:
directly receive said browser communication data composed of text data from said server by using a second session of communication not through said remotely-operated apparatus when said server cooperation process is performed after a session of communication between said external terminal and said server is established as said second session of communication, and
display said browser screen on the basis of said browser communication data composed of text data from said server.

12. The remote operation system according to claim 1, wherein the browser screen includes an instruction button operable by a user, and the remotely-operated apparatus operates in response to operation of the instruction button by the user.

13. A remotely-operated apparatus remotely operated by an external terminal, comprising a hardware processor configured to:
notify said external terminal of a first transition command indicating that a display mode of said external terminal, in which a remote operation screen used for remotely operating said remotely-operated apparatus is displayed on a display part of said external terminal when a server cooperation process which is a cooperation process with said server is performed, should be changed from a transmitted image use mode in which a transmitted image screen which is a display screen based on image data transmitted from said remotely-operated apparatus is displayed to a browser use mode in which a browser screen which is a display screen based on browser communication data composed of text data acquired from a communication partner that is not routed through the remotely-operated apparatus, by using a browser of said external terminal is displayed and for causing said external terminal to change said display mode to said browser use mode;
detect occurrence of a specific event outside said remotely-operated apparatus on the basis of a message from said server, said specific event including transmission from said server of a second transition command indicating that said display mode should be changed from said browser use mode to said transmitted image use mode; and
notify said external terminal of the second transition command indicating that said display mode should be changed from said browser use mode to said transmitted image use mode when the occurrence of said specific event is detected by said hardware processor and for causing said external terminal to change said display mode to said transmitted image use mode.

14. The remotely-operated apparatus according to claim 13,
wherein the hardware processor is further configured to receive said message from said server by using a session of communication after said session of communication between said remotely-operated apparatus and said server is established in response to an execution start instruction for said server cooperation process.

15. The remotely-operated apparatus according to claim 13,
wherein said hardware processor detects occurrence of a specific error in said remotely-operated apparatus as an occurrence of a second specific event inside said remotely-operated apparatus.

16. The remotely-operated apparatus according to claim 15,
wherein said hardware processor detects an error which is classified in advance as a hindrance to continuation of said server cooperation process, among various errors in said remotely-operated apparatus, as said specific error, and does not detect an error which is classified in advance as non-hindrance to the continuation of said server cooperation process, among various errors in said remotely-operated apparatus, as said specific error.

17. The remotely-operated apparatus according to claim 13,
wherein the hardware processor is further configured to determine whether said browser use mode or said transmitted image use mode should be used as said display mode of said external terminal,
wherein said hardware processor determines whether or not an execution start instruction for said server cooperation process was given by a user, on the basis of operation input information received from said external terminal as information on an operation input to said remote operation screen, and when it is determined that said execution start instruction was given, said hardware processor makes a determination that said browser use mode should be used as said display mode of said external terminal, and
said hardware processor notifies said external terminal of said first transition command when said hardware processor makes said determination.

18. The remotely-operated apparatus according to claim 13,
wherein the hardware processor is further configured to determine whether said browser use mode or said transmitted image use mode should be used as said display mode of said external terminal,
wherein said hardware processor determines whether or not a predetermined instruction was given by a user within a period of use of said transmitted image use mode in accordance with said second transition command, on the basis of operation input information received from said external terminal as information on an operation input to said remote operation screen by said user, and when it is determined that said predetermined instruction was given, said hardware processor makes a determination that said browser use mode should be used as said display mode of said external terminal, and
said hardware processor notifies said external terminal of said first transition command when said hardware processor makes said determination.

19. A non-transitory computer-readable recording medium for recording therein a computer program to be executed by a computer embedded in a remotely-operated apparatus remotely operated by an external terminal, to cause said computer to perform the steps of:
a) notifying said external terminal of a first transition command indicating that a display mode of said external terminal, in which a remote operation screen used for remotely operating said remotely-operated apparatus is displayed on a display part of said external terminal when a server cooperation process which is a cooperation process with a server is performed, should be changed from a transmitted image use mode in which a transmitted image screen which is a display screen based on image data transmitted from said remotely-operated apparatus is displayed to a browser use mode in which a browser screen which is a display screen based on browser communication data composed of text data acquired from that is not routed through the remotely-operated apparatus, by using a browser of said external terminal is displayed, and causing said external terminal to change said display mode to said browser use mode;

b) detecting occurrence of a specific event outside said remotely-operated apparatus on the basis of a message from said server, said specific event including transmission from said server of a second transition command indicating that said display mode should be changed from said browser use mode to said transmitted image use mode; and c) notifying said external terminal of the second transition command indicating that said display mode should be changed from said browser use mode to said transmitted image use mode when the occurrence of said specific event is detected, and causing said external terminal to change said display mode of said external terminal to said transmitted image use mode.

20. The non-transitory computer-readable recording medium according to claim 19,
wherein said computer program causes said computer to perform the step of receiving said message from said server by using a session of communication after said session of communication between said remotely-operated apparatus and said server is established in response to an execution start instruction for said server cooperation process.

21. The non-transitory computer-readable recording medium according to claim 19,
wherein said detecting includes detecting occurrence of a specific error in said remotely-operated apparatus as an occurrence of a second specific event inside said remotely-operated apparatus.

22. The non-transitory computer-readable recording medium according to claim 21,
wherein said detecting includes detecting an error which is classified in advance as a hindrance to continuation of said server cooperation process, among various errors in said remotely-operated apparatus, as said specific error, and not detecting an error which is classified in advance as non-hindrance to the continuation of said server cooperation process, among various errors in said remotely-operated apparatus, as said specific error.

23. The non-transitory computer-readable recording medium according to claim 19, wherein said computer program causes said computer to perform the steps of:
determining whether said browser use mode or said transmitted image use mode should be used as said display mode of said external terminal, wherein it is determined whether or not an execution start instruction for said server cooperation process was given by a user, on the basis of operation input information received from said external terminal as information on an operation input to said remote operation screen, and when it is determined that said execution start instruction was given, a determination is made that said browser use mode should be used as said display mode of said external terminal, and notifying said external terminal of said first transition command when said determination is made.

24. The non-transitory computer-readable recording medium according to claim 19, wherein said computer program causes said computer to perform the steps of:
determining whether said browser use mode or said transmitted image use mode should be used as said display mode of said external terminal, wherein it is determined whether or not a predetermined instruction was given by a user within a period of use of said transmitted image use mode in accordance with said second transition command, on the basis of operation input information received from said external terminal as information on an operation input to said remote operation screen by said user, and when it is determined that said predetermined instruction was given, a determination is made that said browser use mode should be used as said display mode of said external terminal; and notifying said external terminal of said first transition command when said determination is made.

\* \* \* \* \*